United States Patent
Matsuura

(10) Patent No.: US 12,534,600 B2
(45) Date of Patent: Jan. 27, 2026

(54) HOLLOW RESIN PARTICLE AND METHOD FOR PRODUCING SAME

(71) Applicant: SEKISUI KASEI CO., LTD., Osaka (JP)

(72) Inventor: Haruhiko Matsuura, Osaka (JP)

(73) Assignee: SEKISUI KASEI CO., LTD., Osaka (JP)

( * ) Notice: Subject to any disclaimer, the term of this patent is extended or adjusted under 35 U.S.C. 154(b) by 0 days.

(21) Appl. No.: 18/671,219

(22) Filed: May 22, 2024

(65) Prior Publication Data

US 2024/0309182 A1    Sep. 19, 2024

Related U.S. Application Data

(63) Continuation of application No. 17/768,103, filed as application No. PCT/JP2020/039134 on Oct. 16, 2020, now Pat. No. 12,031,017.

(30) Foreign Application Priority Data

Oct. 29, 2019    (JP) .................. 2019-195808

(51) Int. Cl.
   *C08L 33/14*    (2006.01)
   *C08J 9/16*    (2006.01)
   *C08L 23/02*    (2006.01)

(52) U.S. Cl.
   CPC .............. *C08L 23/02* (2013.01); *C08L 33/14* (2013.01)

(58) Field of Classification Search
   CPC ......... C08L 23/02; C08L 33/14; B01J 13/185; B01J 13/18; C08F 212/36; C08F 2/44; C08F 255/00; C08F 212/06; C08F 220/285; C08F 2800/00; C08F 212/08; C08F 220/288; C08F 212/12; C08F 2/20; C08F 220/286; C09D 7/70
   See application file for complete search history.

(56) References Cited

FOREIGN PATENT DOCUMENTS

| EP | 3 331 697 A1 | 6/2018 |
|---|---|---|
| JP | 2000-311518 A | 11/2000 |

(Continued)

OTHER PUBLICATIONS

ISR issued in International application No. PCT/ JP2020/039134, Jan. 12, 2021, translation.

(Continued)

*Primary Examiner* — K. Boyle
(74) *Attorney, Agent, or Firm* — GREENBLUM & BERNSTEIN, P.L.C.

(57) ABSTRACT

Provided is a hollow resin particle that can reduce the dielectricity and dielectric loss tangent of a resin layer by introducing an empty area thereinto, and can be obtained by forming a hollow portion in a simple manner. Also provided is a method of producing such hollow resin particle in a simple manner. A hollow resin particle according to an embodiment of the present invention is a hollow resin particle including a shell portion and a hollow portion surrounded by the shell portion, wherein the shell portion contains an aromatic polymer (P1) obtained by polymerizing a monomer composition containing an aromatic crosslinkable monomer (a), an aromatic monofunctional monomer (b), and a (meth)acrylic acid ester-based monomer (c) having a specific structure.

7 Claims, 15 Drawing Sheets

(56) References Cited

FOREIGN PATENT DOCUMENTS

| JP | 2000-313818 A | 11/2000 | | |
|---|---|---|---|---|
| JP | 2002-080503 A | 3/2002 | | |
| JP | 2004-292596 A | 10/2004 | | |
| JP | 5401553 B2 * | 1/2014 | ............ | C08F 212/36 |
| JP | 2016-069619 A | 5/2016 | | |
| JP | 2016068037 A * | 5/2016 | | |
| JP | 6513273 B | 4/2019 | | |
| WO | 2004/067638 A1 | 8/2004 | | |
| WO | 2009/112382 A1 | 9/2009 | | |
| WO | 2011/040376 A1 | 4/2011 | | |
| WO | 2017/023830 A1 | 2/2017 | | |

OTHER PUBLICATIONS

EESR issued in EP Patent Application No. 20881295.8, Oct. 20, 2023.
Office Action issued in CN Patent Application No. 202080076215.5 Mar. 14, 2023, translation.
Office Action issued in CN Patent Application No. 202080076215.5 Aug. 17, 2023, translation.
Notification of Grant issued in CN Patent Application No. 202080076215.5 Dec. 1, 2023, translation.

* cited by examiner

HOLLOW RESIN PARTICLE AND METHOD FOR PRODUCING SAME

This application is a Continuation of U.S. patent application Ser. No. 17/768,103, filed Apr. 11, 2022, which is a U.S. National Stage Entry of International Patent Application No. PCT/JP2020/039134, filed Oct. 16, 2020, and which claims the benefit of Japanese Patent Application No. 2019-195808, filed Oct. 29, 2019. The disclosure of each of the applications listed above are incorporated by reference herein in their entirety.

TECHNICAL FIELD

The present invention relates to a hollow resin particle and a method of producing the same.

BACKGROUND ART

In order to achieve an increase in speed of information processing with an electronic device, attempts are being made to reduce the dielectricity and dielectric loss tangent of an insulating layer of a multilayer printed board. As one of the attempts, an investigation is being made into introducing an empty area into a resin layer to achieve reductions in dielectricity and dielectric loss tangent by mixing, into a thermosetting resin, a hollow particle having a shell portion and a hollow portion surrounded by the shell portion.

As the hollow particle, for example, there is a report that an acrylic hollow resin particle is obtained by subjecting monomers including an acrylic polyfunctional monomer, which is typified by trimethylolpropane tri(meth)acrylate or dipentaerythritol hexaacrylate, as a main component to suspension polymerization together with a hydrophobic solvent (Patent Literature 1).

It is known that an acrylic resin generally has high numerical values for its relative dielectric constant and dielectric loss tangent. For this reason, the acrylic hollow resin particle as described in Patent Literature 1 is unsuited for the purpose of achieving reductions in dielectricity and dielectric loss tangent of the resin layer.

In addition, as the hollow particle, for example, there is a report that a styrene-based hollow resin particle is obtained by subjecting divinylbenzene to suspension polymerization together with a saturated hydrocarbon having 8 to 18 carbon atoms (specifically hexadecane) (Patent Literature 2).

The styrene-based hollow resin particle as described in Patent Literature 2 is formed of a material (crosslinked polystyrene) having a low relative dielectric constant and a low dielectric loss tangent as compared to the acrylic hollow resin particle. Accordingly, the particle is effective for the purpose of achieving reductions in dielectricity and dielectric loss tangent of the resin layer. However, its production involves use of the saturated hydrocarbon having 8 to 18 carbon atoms (specifically hexadecane), and hence solvent removal from the hollow portion by distillation or the like is difficult. Accordingly, the saturated hydrocarbon having 8 to 18 carbon atoms remains in the styrene-based hollow resin particle to be obtained, and hence it is difficult to obtain a styrene-based hollow resin particle whose hollow portion has been completely replaced with air. In addition, the styrene-based hollow resin particle whose hollow portion has been completely replaced with air is costly to produce owing to the above-mentioned solvent removal.

CITATION LIST

Patent Literature

[PTL 1] JP 6513273 B1
[PTL 2] JP 2002-080503 A

SUMMARY OF INVENTION

Technical Problem

The present invention has been made in order to solve the problems of the related art described above, and a primary object of the present invention is to provide a hollow resin particle that can reduce the dielectricity and dielectric loss tangent of a resin layer by introducing an empty area thereinto, and can be obtained by forming a hollow portion in a simple manner. Another object of the present invention is to provide a method of producing such hollow resin particle in a simple manner.

Solution to Problem

According to one embodiment of the present invention, there is provided a hollow resin particle, including:
a shell portion; and
a hollow portion surrounded by the shell portion,
wherein the shell portion contains an aromatic polymer (P1) obtained by polymerizing a monomer composition containing:
an aromatic crosslinkable monomer (a);
an aromatic monofunctional monomer (b); and
a (meth)acrylic acid ester-based monomer (c) represented by the formula (1):

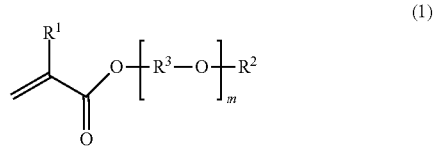

where $R^1$ represents H or $CH_3$, $R^2$ represents H, an alkyl group, or a phenyl group, $R_3$—O represents an oxyalkylene group having 2 to 18 carbon atoms, and "m" represents an average number of moles added of the oxyalkylene group and represents a number of from 1 to 100.

In one embodiment, the oxyalkylene group is at least one kind selected from the group consisting of: an oxyethylene group; an oxypropylene group; and an oxybutylene group.

In one embodiment, the monomer composition contains 10 wt % to 70 wt % of the aromatic crosslinkable monomer (a), 10 wt % to 70 wt % of the aromatic monofunctional monomer (b), and 0.5 wt % to 30 wt % of the (meth)acrylic acid ester-based monomer (c) represented by the formula (1).

In one embodiment, the shell portion contains the aromatic polymer (P1) and a non-crosslinked polymer (P2) that is at least one kind selected from the group consisting of: polyolefin; a styrene-based polymer; a (meth)acrylic acid-based polymer; and a styrene-(meth)acrylic acid-based polymer.

In one embodiment, the aromatic crosslinkable monomer (a) is divinylbenzene.

In one embodiment, the aromatic monofunctional monomer (b) is at least one kind selected from the group consisting of: styrene; and ethylvinylbenzene.

According to one embodiment of the present invention, there is provided a method of producing the hollow resin particle according to the embodiment of the present invention, including dispersing an organic mixed solution in an aqueous solution containing at least one kind selected from the group consisting of: a dispersion stabilizer; and a surfactant, followed by suspension polymerization, the organic mixed solution containing a monomer composition containing an aromatic crosslinkable monomer (a), an aromatic monofunctional monomer (b), and a (meth)acrylic acid ester-based monomer (c) represented by the formula (1), a polymerization initiator, and an organic solvent having a boiling point of less than 100° C.:

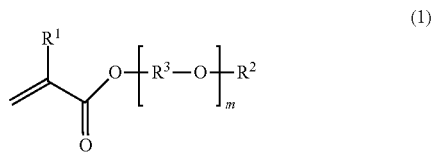

(1)

where $R^1$ represents H or $CH_3$, $R^2$ represents H, an alkyl group, or a phenyl group, $R^3$—O represents an oxyalkylene group having 2 to 18 carbon atoms, and "m" represents an average number of moles added of the oxyalkylene group and represents a number of from 1 to 100.

According to one embodiment of the present invention, there is provided a semiconductor material, including the hollow resin particle according to the embodiment of the present invention.

Advantageous Effects of Invention

According to the embodiments of the present invention, the hollow resin particle can be provided, which can reduce the dielectricity and dielectric loss tangent of a resin layer by introducing an empty area thereinto, and can be obtained by forming a hollow portion in a simple manner. In addition, the method of producing such hollow resin particle in a simple manner can be provided.

DESCRIPTION OF EMBODIMENTS

Figure 1:
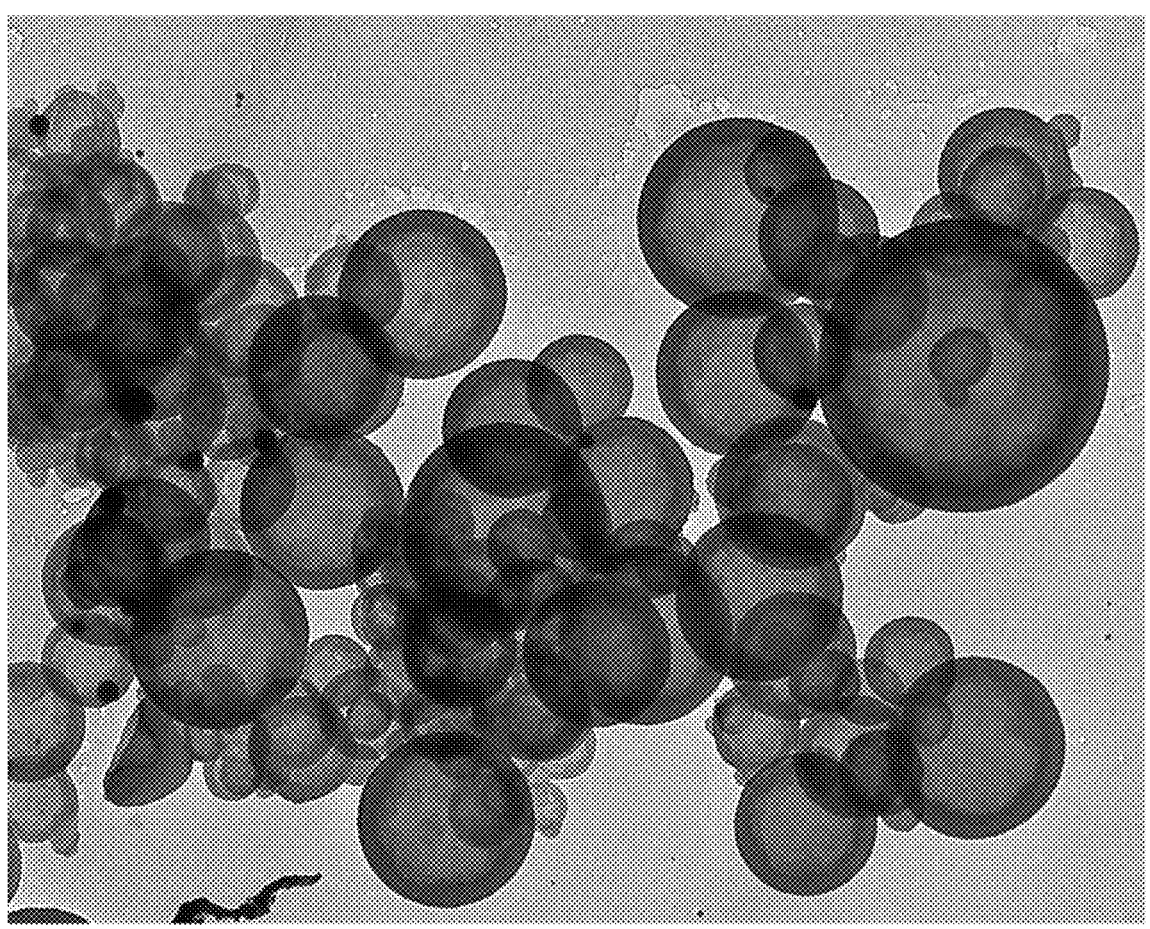
FIG. 1 is a TEM photograph of hollow resin particles (1) obtained in Example 1.

Now, embodiments of the present invention are described.
However, the present invention is not limited to these embodiments.

<<<<1. Hollow Resin Particle>>>>
<<1-1. Structure of Hollow Resin Particle>>

A hollow resin particle according to an embodiment of the present invention is a hollow resin particle including a shell portion and a hollow portion surrounded by the shell portion. The term "hollow" as used herein means a state in which an inside is filled with a substance other than a resin, such as a gas or a liquid, and preferably means a state in which the inside is filled with a gas from the standpoint that the effect of the present invention can be expressed to a greater degree.

The hollow portion may be formed of one hollow region, or may be formed of a plurality of hollow regions. From the viewpoint of relatively increasing the amount of a resin component forming the shell portion to prevent a base material or the like from entering the hollow portion, the hollow portion is preferably formed of one hollow region.

The average particle diameter of the hollow resin particle is preferably from 0.1 μm to 5.0 μm, more preferably from 0.15 μm to 1.0 μm, still more preferably from 0.2 μm to 0.8 μm, particularly preferably from 0.3 μm to 0.6 μm. When the average particle diameter of the hollow resin particle falls within the above-mentioned ranges, the effect of the present invention can be expressed to a greater degree. When the average particle diameter of the hollow resin particle is less than 0.1 μm, the thickness of the shell portion is relatively small, and hence there is a risk in that a hollow resin particle having sufficient strength may not be obtained. When the average particle diameter of the hollow resin particle is more than 5.0 μm, there is a risk in that phase separation may not easily occur between a polymer produced through polymerization of monomer components in suspension polymerization and a solvent, and hence there is a risk in that it may be difficult to form the shell portion.

<<1-2. Shell Portion>>

The shell portion contains an aromatic polymer (P1) obtained by polymerizing a monomer composition containing an aromatic crosslinkable monomer (a), an aromatic monofunctional monomer (b), and a (meth)acrylic acid ester-based monomer (c). By virtue of the shell portion containing such aromatic polymer (P1) obtained by polymerizing the monomer composition containing the aromatic crosslinkable monomer (a), the aromatic monofunctional monomer (b), and the (meth)acrylic acid ester-based monomer (c), the effect of the present invention can be expressed. Particularly by virtue of the adoption of the (meth)acrylic acid ester-based monomer (c) having a specific structure as a constituent monomer of the aromatic polymer (P1), the effect of the present invention can be expressed.

From the standpoint that the effect of the present invention can be expressed to a greater degree, the content ratio of the aromatic polymer (P1) in the shell portion is preferably from 60 wt % to 100 wt %, more preferably from 70 wt % to 100 wt %, still more preferably from 80 wt % to 100 wt %, particularly preferably from 90 wt % to 100 wt %.

<Aromatic Polymer (P1)>

The aromatic polymer (P1) is obtained by polymerizing the monomer composition containing the aromatic crosslinkable monomer (a), the aromatic monofunctional monomer (b), and the (meth)acrylic acid ester-based monomer (c). That is, the aromatic polymer (P1) has a structural unit derived from the aromatic crosslinkable monomer (a), a structural unit derived from the aromatic monofunctional monomer (b), and a structural unit derived from the (meth)acrylic acid ester-based monomer (c).

From the standpoint that the effect of the present invention can be expressed to a greater degree, the monomer composition contains preferably 10 wt % to 70 wt % of the aromatic crosslinkable monomer (a), 10 wt % to 70 wt % of the aromatic monofunctional monomer (b), and 0.5 wt % to 30 wti of the (meth)acrylic acid ester-based monomer (c), more preferably 20 wt % to 65 wt % of the aromatic crosslinkable monomer (a), 20 wt % to 65 wt % of the aromatic monofunctional monomer (b), and 1 wt % to 25 wt % of the (meth)acrylic acid ester-based monomer (c), still more preferably 30 wt % to 60 wt % of the aromatic crosslinkable monomer (a), 30 wt % to 60 wt % of the aromatic monofunctional monomer (b), and 1.5 wt % to 20 wt % of the (meth)acrylic acid ester-based monomer (c), particularly preferably 40 wt % to 50 wt % of the aromatic crosslinkable monomer (a), 40 wt % to 50 wt % of the aromatic monofunctional monomer (b), and 2 wt % to 15 wt % of the (meth)acrylic acid ester-based monomer (c).

The monomer composition contains the aromatic crosslinkable monomer (a), the aromatic monofunctional monomer (b), and the (meth)acrylic acid ester-based monomer (c). From the standpoint that the effect of the present invention can be expressed to a greater degree, the total content ratio of the aromatic crosslinkable monomer (a), the aromatic monofunctional monomer (b), and the (meth)acrylic acid ester-based monomer (c) in the monomer composition is preferably from 80 wt % to 100 wt %, more preferably from 85 wt % to 100 wt %, still more preferably from 90 wt % to 100 wt %, particularly preferably from 95 wt % to 100 wt %.

The monomer composition may contain any appropriate other monomer in addition to the aromatic crosslinkable monomer (a), the aromatic monofunctional monomer (b), and the (meth)acrylic acid ester-based monomer (c) to such an extent that the effect of the present invention is not impaired. The other monomers may be used alone or in combination thereof.

(Aromatic Crosslinkable Monomer (a))

Any appropriate aromatic crosslinkable monomer may be adopted as the aromatic crosslinkable monomer (a) as long as the aromatic monomer has crosslinkability to such an extent that the effect of the present invention is not impaired. From the standpoint that the effect of the present invention can be expressed to a greater degree, examples of such aromatic crosslinkable monomer (a) include divinylbenzene, divinylnaphthalene, and diallyl phthalate. From the standpoint that the effect of the present invention can be expressed to a still greater degree, and the standpoint of reactivity, the aromatic crosslinkable monomer (a) is preferably divinylbenzene.

The aromatic crosslinkable monomers (a) may be used alone or in combination thereof.

(Aromatic Monofunctional Monomer (b))

Any appropriate aromatic monofunctional monomer may be adopted as the aromatic monofunctional monomer (b) as long as the aromatic monomer is monofunctional to such an extent that the effect of the present invention is not impaired. From the standpoint that the effect of the present invention can be expressed to a greater degree, examples of such aromatic monofunctional monomer (b) include styrene, ethylvinylbenzene, α-methylstyrene, vinyltoluene, o-chlorostyrene, m-chlorostyrene, p-chlorostyrene, vinylbiphenyl, and vinylnaphthalene. From the standpoint that the effect of the present invention can be expressed to a still greater degree, and the standpoint of reactivity, the aromatic monofunctional monomer (b) is preferably at least one kind selected from the group consisting of: styrene; and ethylvinylbenzene.

The aromatic monofunctional monomers (b) may be used alone or in combination thereof.

((Meth)acrylic Acid Ester-based Monomer (c))

The (meth)acrylic acid ester-based monomer (c) is represented by the formula (1).

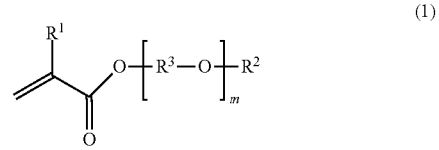

In the formula (1), $R^1$ represents H or $CH_3$.

In the formula (1), $R^2$ represents H, an alkyl group, or a phenyl group.

In the formula (1), $R^3$—O represents an oxyalkylene group having 2 to 18 carbon atoms. That is, in the formula (1), $R^3$ represents an alkylene group having 2 to 18 carbon atoms.

In the formula (1), $R^3$—O represents an oxyalkylene group having 2 to 18 carbon atoms, preferably an oxyalkylene group having 2 to 8 carbon atoms, more preferably an oxyalkylene group having 2 to 4 carbon atoms. In addition, when $R^3$—O represents any appropriate two or more kinds selected from an oxyethylene group, an oxypropylene group, an oxybutylene group, and the like, the addition mode of $R^3$—O may be any mode, such as random addition, block addition, or alternating addition. The term "addition mode" as used herein means the mode itself, and does not mean that $R^3$—O needs to be obtained through an addition reaction.

In the formula (1), from the standpoint that the effect of the present invention can be expressed to a greater degree, $R^3$—O represents at least one kind selected from the group consisting of: an oxyethylene group; an oxypropylene group; and an oxybutylene group (typically an oxytetramethylene group).

In the formula (1), "m" represents the average number of moles added (sometimes referred to as "chain length") of the oxyalkylene group. "m" represents a number of from 1 to 100, preferably a number of from 1 to 40, more preferably a number of from 2 to 30, still more preferably a number of from 3 to 20, particularly preferably a number of from 4 to 18, most preferably a number of from 5 to 15. When "m" falls within the above-mentioned ranges, the effect of the present invention can be expressed to a greater degree.

In the formula (1), in the case where $R^3$—O represents two or more kinds, such as the case where $R^3$—O is formed of an oxyethylene group ($C_2H_4O$) and an oxypropylene group ($C_3H_6O$), "m" represents the total of the average numbers of moles added of the respective oxyalkylene groups. Specifically, for example, when-$(R^3$—O$)_m$— represents —[$(C_2H_4O)_p$ $(C_3H_6O)_q$]- (as described above, the addition mode may be any mode, such as random addition, block addition, or alternating addition), m=p+q.

From the standpoint that the effect of the present invention can be expressed to a greater degree, examples of the (meth)acrylic acid ester-based monomer (c) include methoxy polyethylene glycol methacrylate, ethoxy polyethylene glycol methacrylate, propoxy polyethylene glycol methacrylate, butoxy polyethylene glycol methacrylate, hexoxy polyethylene glycol methacrylate, octoxy polyethylene glycol polypropylene glycol methacrylate, lauroxy polyethylene glycol methacrylate, stearoxy polyethylene glycol methacrylate, phenoxy polyethylene glycol polypropylene glycol methacrylate, methoxy polyethylene glycol acrylate, polyethylene glycol monomethacrylate, polypropylene glycol monomethacrylate, polyethylene glycol propylene glycol monomethacrylate, polyethylene glycol tetramethylene glycol monomethacrylate, propylene glycol polybutylene glycol monomethacrylate, monoethylene glycol monoacrylate, and polypropylene glycol monoacrylate.

As the (meth)acrylic acid ester-based monomer (c), commercially available products may also be adopted, and for example, products available under the product name "BLEMMER" series from NOF Corporation may be adopted.

The (meth)acrylic acid ester-based monomers (c) may be used alone or in combination thereof.

<Non-crosslinked Polymer (P2)>

The shell portion may contain the aromatic polymer (P1) and a non-crosslinked polymer (P2) that is at least one kind selected from the group consisting of: polyolefin; a styrene-based polymer; a (meth)acrylic acid-based polymer; and a styrene-(meth)acrylic acid-based polymer.

From the standpoint that the effect of the present invention can be expressed to a greater degree, the content ratio of the non-crosslinked polymer (P2) in the shell portion is preferably from 0 wt % to 40 wt %, more preferably from 0 wt % to 30 wt %, still more preferably from 0 wt % to 20 wt %, particularly preferably from 0 wt % to 10 wt %.

Examples of the polyolefin include polyethylene, polypropylene, and poly-α-olefin. From the viewpoint of solubility in the monomer composition, a side chain crystalline polyolefin using a long-chain α-olefin as a raw material, or a low-molecular-weight polyolefin or olefin oligomer produced with a metallocene catalyst is preferably used.

Examples of the styrene-based polymer include polystyrene, a styrene-acrylonitrile copolymer, and an acrylonitrile-butadiene-styrene copolymer.

Examples of the (meth)acrylic acid-based polymer include polymethyl (meth)acrylate, polyethyl (meth)acrylate, polybutyl (meth)acrylate, and polypropyl (meth)acrylate.

Examples of the styrene-(meth)acrylic acid-based polymer include a styrene-methyl (meth)acrylate copolymer, a styrene-ethyl (meth)acrylate copolymer, a styrene-butyl (meth)acrylate copolymer, and a styrene-propyl (meth)acrylate copolymer.

<<1-3. Relative Dielectric Constant of Hollow Resin Particle>>

The relative dielectric constant of the hollow resin particle according to the embodiment of the present invention is preferably from 1.0 to 2.5, more preferably from 1.0 to 2.4, still more preferably from 1.0 to 2.3. When the relative dielectric constant of the hollow resin particle according to the embodiment of the present invention falls within the above-mentioned ranges, the effect of the present invention can be expressed to a greater degree. When the relative dielectric constant of the hollow resin particle according to the embodiment of the present invention is more than 2.5, a sufficient dielectricity-reducing effect cannot be obtained by mixing the hollow resin particle into, for example, a thermosetting resin.

The relative dielectric constant of the hollow resin particle according to the embodiment of the present invention may be calculated with reference to, for example, "Dielectric Constant of Mixed Systems" (Oyo Buturi, Volume 27, Issue 8 (1958)). The following equation is established, where $\epsilon$ represents the relative dielectric constant of a mixed system of a dispersion medium and the hollow resin particle, $\epsilon_1$ represents the relative dielectric constant of a base material (e.g., a resin composition of polyimide, an epoxy, or the like) serving as the dispersion medium, $\epsilon_2$ represents the relative dielectric constant of the hollow resin particle, and $\varphi$ represents the volume fraction of the hollow resin particle in the mixed system. That is, when $\epsilon$, $\epsilon_1$, and $\varphi$ are experimentally determined, the relative dielectric constant $\epsilon_2$ of the hollow resin particle can be calculated.

$$\frac{\varepsilon - \varepsilon_1}{\varepsilon + 2\varepsilon_1} = \frac{\varepsilon_2 - \varepsilon_1}{\varepsilon_2 + 2\varepsilon_1}\varphi$$

The volume fraction $\varphi$ of the hollow resin particle in the mixed system of the dispersion medium and the hollow resin particle may be determined as follows.

$$\varphi = \frac{\dfrac{\text{Weight of hollow resin particle in mixed system (g)}}{\text{Density of hollow resin particle (g/cm}^3\text{)}}}{\dfrac{\text{Weight of hollow resin particle in mixed system (g)}}{\text{Density of hollow resin particle (g/cm}^3\text{)}} + \dfrac{\text{Weight of base material in mixed system (g)}}{\text{Density of base material (g/cm}^3\text{)}}}$$

The density of the hollow resin particle may be experimentally determined using a pycnometer (COTEC Corporation, TQC 50 mL Pyknometer) and a liquid polymer ARUFON UP-1080 (Toagosei Co., Ltd., density: 1.05 g/cm$^3$). Specifically, the hollow resin particle and ARUFON UP-1080 are defoamed and stirred using a planetary stirring defoamer (manufactured by Kurabo Industries Ltd., Mazerustar KK-250) so that the ratio of the hollow resin particle may be 10 wt %, to thereby produce a mixture for evaluation. The mixture for evaluation is loaded into the pycnometer having a capacity of 50 mL, and the weight of the loaded mixture for evaluation is calculated by subtracting the weight of the pycnometer in an empty state from the weight of the pycnometer filled with the mixture. From the resultant value, the density of the hollow resin particle may be calculated using the following equation.

$$\text{Density of hollow resin particle (g/cm}^3\text{)} = \frac{\text{Weight of mixture for evaluation (g)} \times 0.1}{50 \text{ (cm}^3\text{)} - \dfrac{\text{Weight of mixture for evaluation (g)} \times 0.9}{\text{Density of } UP-1080 \text{ (g/cm}^3\text{)}}}$$

<<1-4. Applications of Hollow Resin Particle>>

The hollow resin particle according to the embodiment of the present invention may be adopted in various applications. From the standpoint that the effect of the present invention can be utilized to a greater degree, the hollow resin particle is suitable for semiconductor materials, such as an interlayer insulating film, a dry film resist, a solder resist, a bonding wire, a magnet wire, a semiconductor sealing material, an epoxy sealing material, a molded underfill, an underfill, a die bond paste, a buffer coating material, a copper clad laminate, and a flexible board. The hollow resin particle is particularly suitable for, among the above-mentioned semiconductor materials, semiconductor materials, such as an interlayer insulating film, a solder resist, a magnet wire, an epoxy sealing material, an underfill, a buffer coating material, a copper clad laminate, and a flexible board. The reductions in dielectricity and dielectric loss tangent can be achieved by adding the hollow resin particle according to the embodiment of the present invention to, for example, polyphenylene ether, polyimide, polybismaleimide, or an epoxy resin, which is generally used in such semiconductor material. That is, a semiconductor material according to an embodiment of the present invention contains the hollow resin particle according to the embodiment of the present invention. In addition, the hollow resin particle according to the embodiment of the present invention may also be used in applications, such as a paint composition, a cosmetic material, a paper-coating composition, a heat-insulating composition, a light-diffusible composition, and a light-diffusing film.

<<<<2. Method of producing Hollow Resin Particle>>>>

A method of producing the hollow resin particle according to the embodiment of the present invention includes dispersing an organic mixed solution in an aqueous solution containing at least one kind selected from the group consisting of: a dispersion stabilizer; and a surfactant, followed by suspension polymerization, the organic mixed solution containing a monomer composition containing an aromatic crosslinkable monomer (a), an aromatic monofunctional monomer (b), and a (meth)acrylic acid ester-based monomer (c) represented by the formula (1), a polymerization initiator, and an organic solvent having a boiling point of less than 100° C.:

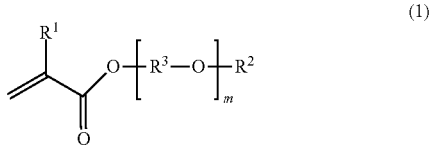

(1)

where $R^1$ represents H or $CH_3$, $R^2$ represents H, an alkyl group, or a phenyl group, $R_3$—O represents an oxyalkylene group having 2 to 18 carbon atoms, and "m" represents the average number of moles added of the oxyalkylene group and represents a number of from 1 to 100.

The dispersion of the organic mixed solution in the aqueous solution may be performed by a known method without any particular limitation as long as the organic mixed solution can be caused to exist as droplets in the aqueous solution.

In the method of producing the hollow resin particle according to the embodiment of the present invention, the monomer composition contained in the organic mixed solution contains the aromatic crosslinkable monomer (a), the aromatic monofunctional monomer (b), and the (meth) acrylic acid ester-based monomer (c), and hence the organic solvent having a boiling point of less than 100° C. can be preferably used as an organic solvent used in the suspension polymerization. Accordingly, the solvent can be easily removed from the hollow portion of the hollow resin particle to be obtained, to thereby enable a reduction in production cost.

<<2-1. Aqueous Solution (Aqueous Phase)>>

The aqueous solution contains an aqueous medium and at least one kind selected from the group consisting of: a dispersion stabilizer; and a surfactant.

Examples of the aqueous medium include water and a mixed medium of water and a lower alcohol (e.g., methanol or ethanol).

Examples of the dispersion stabilizer include polyvinyl alcohol, polycarboxylic acids, celluloses (e.g., hydroxyethyl cellulose and carboxymethyl cellulose), and polyvinylpyrrolidone. In addition, an inorganic water-soluble high-molecular-weight compound such as sodium tripolyphosphate may be used in combination. Further, there may also be used, for example: phosphoric acid salts, such as calcium phosphate, magnesium phosphate, aluminum phosphate, and zinc phosphate; pyrophosphoric acid salts, such as calcium pyrophosphate, magnesium pyrophosphate, aluminum pyrophosphate, and zinc pyrophosphate; and poorly water-soluble inorganic compounds, such as calcium carbonate, magnesium carbonate, calcium hydroxide, magnesium hydroxide, aluminum hydroxide, calcium metasilicate, calcium sulfate, barium sulfate, and colloidal silica.

The addition amount of the dispersion stabilizer is preferably from 0.5 part by weight to 10 parts by weight with respect to 100 parts by weight of the organic mixed solution. The dispersion stabilizers may be used alone or in combination thereof.

Examples of the surfactant include an anionic surfactant, a cationic surfactant, an amphoteric surfactant, and a nonionic surfactant.

Examples of the anionic surfactant include: non-reactive anionic surfactants, such as an alkyl sulfate ester fatty acid salt, an alkylbenzenesulfonic acid salt, an alkylnaphthalenesulfonic acid salt, an alkanesulfonic acid salt, an alkyl diphenyl ether sulfonic acid salt, a dialkylsulfosuccinic acid salt, a monoalkylsulfosuccinic acid salt, and a polyoxyethylene alkyl phenyl ether phosphoric acid salt; and reactive anionic surfactants, such as a polyoxyethylene-1-(allyloxymethyl)alkyl ether sulfate ester ammonium salt, a polyoxyethylene alkyl propenyl phenyl ether sulfate ester ammonium salt, and an ammonium polyoxyalkylene alkenyl ether sulfate.

Examples of the cationic surfactant include cationic surfactants, such as an alkyltrimethylammonium salt, an alkyltriethylammonium salt, a dialkyldimethylammonium salt, a dialkyldiethylammonium salt, and an N-polyoxyalkylene-N, N, N-trialkylammonium salt.

Examples of the amphoteric surfactant include lauryldimethylamine oxide, a phosphoric acid ester salt, and a phosphorus acid ester-based surfactant.

Examples of the nonionic surfactant include a polyoxyethylene alkyl ether, a polyoxyethylene alkyl phenyl ether, a polyoxyethylene fatty acid ester, a sorbitan fatty acid ester, a polysorbitan fatty acid ester, a polyoxyethylene alkylamine, a glycerin fatty acid ester, and an oxyethylene-oxypropylene block polymer.

The addition amount of the surfactant is preferably from 0.01 part by weight to 1 part by weight with respect to 100 parts by weight of the organic mixed solution. The surfactants may be used alone or in combination thereof.

The aqueous solution may contain any appropriate other component to such an extent that the effect of the present invention is not impaired.

<<2-2. Organic Mixed Solution (Oil Phase)>>

The organic mixed solution contains the monomer composition containing the aromatic crosslinkable monomer (a), the aromatic monofunctional monomer (b), and the (meth) acrylic acid ester-based monomer (c), the polymerization initiator, and the organic solvent having a boiling point of less than 100° C.

The description in the item <Aromatic Polymer (P1)> in <<1-2. Shell Portion>> in <<<<1. Hollow Resin Particle>>>> may be cited as it is for the monomer composition contained in the organic mixed solution.

Any appropriate polymerization initiator may be adopted as the polymerization initiator to such an extent that the effect of the present invention is not impaired. Examples of such polymerization initiator include: organic peroxides, such as lauroyl peroxide, benzoyl peroxide, orthochlorobenzoyl peroxide, orthomethoxybenzoyl peroxide, 3,5,5-trimethylhexanoyl peroxide, t-butyl peroxy-2-ethylhexanoate, and di-t-butyl peroxide; and azo-based compounds, such as 2,2'-azobisisobutyronitrile, 1,1'-azobiscyclohexanecarbonitrile, and 2,2'-azobis (2,4-dimethylvaleronitrile).

The addition amount of the polymerization initiator preferably falls within the range of from 0.1 part by weight to 5 parts by weight with respect to 100 parts by weight of the monomer composition. The polymerization initiators may be used alone or in combination thereof.

Examples of the organic solvent having a boiling point of less than 100° C. that are suitable in the method of producing the hollow resin particle according to the embodiment of the present invention include heptane, hexane, cyclohexane, methyl acetate, ethyl acetate, methyl ethyl ketone, chloroform, and carbon tetrachloride.

The organic solvent having a boiling point of less than 100° C. may be a mixed solvent.

The addition amount of the organic solvent having a boiling point of less than 100° C. is preferably from 20 parts by weight to 250 parts by weight with respect to 100 parts by weight of the monomer composition.

The organic mixed solution may contain any appropriate other component to such an extent that the effect of the present invention is not impaired. An example of such other component is <Non-crosslinked Polymer (P2)> in <<1-2. Shell Portion>> in <<<<1. Hollow Resin Particle>>>>.

The addition amount of the non-crosslinked polymer (P2) is preferably from 0 parts by weight to 67 parts by weight with respect to 100 parts by weight of the monomer composition. The non-crosslinked polymers (P2) may be used alone or in combination thereof.

<<2-3. Suspension Polymerization>>

The organic mixed solution is dispersed in the aqueous solution, and the formed suspension is polymerized and preferably post-heated. Thus, the hollow resin particle is obtained.

Any appropriate dispersion method may be adopted for the dispersion as long as the organic mixed solution can be caused to exist as droplets in the aqueous solution to such an extent that the effect of the present invention is not impaired. Such dispersion method is typically a dispersion method using a homogenizer, and examples thereof include an ultrasonic homogenizer and a high-pressure homogenizer.

As a polymerization temperature, any appropriate polymerization temperature may be adopted as long as the temperature is suited for the suspension polymerization to such an extent that the effect of the present invention is not impaired. Such polymerization temperature is preferably from 30° C. to 80° C.

As a polymerization time, any appropriate polymerization time may be adopted as long as the time is suited for the suspension polymerization to such an extent that the effect of the present invention is not impaired. Such polymerization time is preferably from 1 hour to 20 hours.

The post-heating to be preferably performed after the polymerization is a treatment suitable for obtaining a hollow resin particle of high perfection.

Any appropriate temperature may be adopted as the temperature of the post-heating to be preferably performed after the polymerization to such an extent that the effect of the present invention is not impaired. Such temperature of the post-heating is preferably from 70° C. to 120° C.

Any appropriate time may be adopted as the time of the post-heating to be preferably performed after the polymerization to such an extent that the effect of the present invention is not impaired. Such time of the post-heating is preferably from 1 hour to 10 hours.

EXAMPLES

The present invention is specifically described below by way of Examples, but the present invention is not limited to these Examples. "Part (s)" means "part (s) by weight" and "%" means "wt %" unless otherwise specified.

(Average Particle Diameter)

The Z-average particle diameter of hollow resin particles or particles was measured by utilizing a dynamic light scattering method, and the measured Z-average particle diameter was defined as the average particle diameter of the obtained hollow resin particles or particles.

That is, first, the obtained hollow resin particles or particles in the form of a slurry were diluted with ion-exchanged water and adjusted to 0.1 wt %, the resultant water dispersion was irradiated with laser light, and a scattered light intensity scattered from the hollow resin particles or the particles was measured with time change in microseconds. Then, the detected scattering intensity distribution derived from the hollow resin particles or the particles was fitted to a normal distribution, and the Z-average particle diameter of the hollow resin particles or the particles was determined by a cumulant analysis method for calculating an average particle diameter.

The measurement of the Z-average particle diameter may be simply performed with a commercially available particle diameter measurement apparatus. In each of the following Examples and Comparative Examples, the Z-average particle diameter was measured using a particle diameter measurement apparatus (Zetasizer Nano ZS manufactured by Malvern). In general, a commercially available particle diameter measurement apparatus has data analysis software installed thereon, and is capable of calculating a Z-average particle diameter by having the data analysis software automatically analyzing measurement data.

(TEM Measurement: Observation of Presence or Absence of Hollow and Shape of Hollow Resin Particles or Particles)

Hollow resin particles or particles as dry powder were subjected to surface treatment (10 Pa, 5 mA, 10 seconds) using an "Osmium Coater Neoc-Pro" coating apparatus manufactured by Meiwafosis Co., Ltd. Then, the hollow resin particles or the particles were observed with a transmission electron microscope (TEM, H-7600 by manufactured Hitachi High-Technologies Corporation) to determine the presence or absence of a hollow and the shape of the hollow resin particles or the particles. At this time, an image was taken at an acceleration voltage of 80 kV and a magnification of 5,000 times or 10,000 times.

Example 1

1.15 g of styrene (St), 1.85 g of divinylbenzene (DVB) 810 (Nippon Steel Chemical & Material Co., Ltd., product containing 81% thereof and 19% of ethylvinylbenzene (EVB)), 2.4 g of heptane, 0.3 g of HS Crysta-4100 (side chain crystalline polyolefin, Hokoku Corporation), 0.3 g of BLEMMER 50PEP-300 (polyethylene glycol propylene glycol monomethacrylate (in the formula (1), $R^1$=$CH_3$, $R^2$=H, $(R^3-O)_m$=$[(C_2H_4O)_{3.5} (C_3H_6O)_{2.5}]$, random addition mode), NOF Corporation), and 0.099 g of PEROYL L (polymerization initiator, NOF Corporation) were mixed to produce an oil phase. Then, 34 g of ion-exchanged water and 0.017 g of RAPISOL A-80 (surfactant, NOF Corporation) were mixed to produce an aqueous phase.

The oil phase was added to the aqueous phase, and an ultrasonic homogenizer (manufactured by BRANSON, SONIFIER 450, conditions: Duty Cycle=50%, Output Control=5, treatment time: 3 minutes) was used to produce a suspension. The resultant suspension was heated at 70° C. for 4 hours, and was thus polymerized to provide a slurry. The resultant slurry was heated at 100° C. for 24 hours to provide hollow resin particles (1) as dry powder. The resultant hollow resin particles (1) had an average particle diameter of 356 nm and a particle density of 0.65 g/cm$^3$. In addition, the TEM observation result of the resultant hollow resin particles (1) is shown in FIG. 1. It was able to be recognized that the hollow resin particles (1) were hollow resin particles each having a hollow surrounded by a shell. Blending amounts and the like are shown in Table 1.

Example 2

Figure 2:
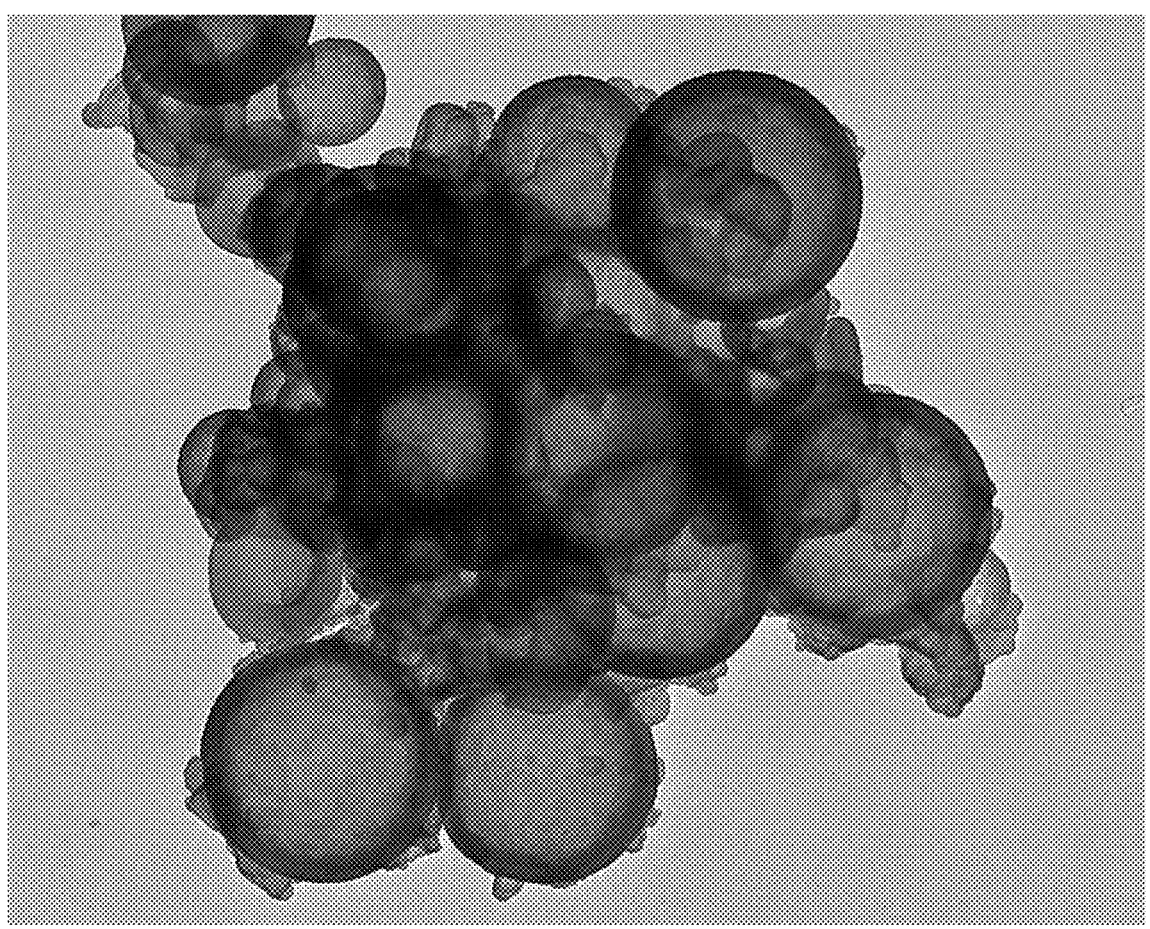
FIG. 2 is a TEM photograph of hollow resin particles (2) obtained in Example 2.

Hollow resin particles (2) were obtained by performing the same operations as in Example 1 except for using 0.92 g of styrene, 1.48 g of divinylbenzene 810, 3.0 g of heptane, and 0.10 g of PEROYL L. The resultant hollow resin particles (2) had an average particle diameter of 382 nm and a particle density of 0.64 g/cm$^3$. In addition, the TEM observation result of the resultant hollow resin particles (2) is shown in FIG. 2. It was able to be recognized that the hollow resin particles (2) were hollow resin particles each having a hollow surrounded by a shell. Blending amounts and the like are shown in Table 1.

Example 3

Figure 3:
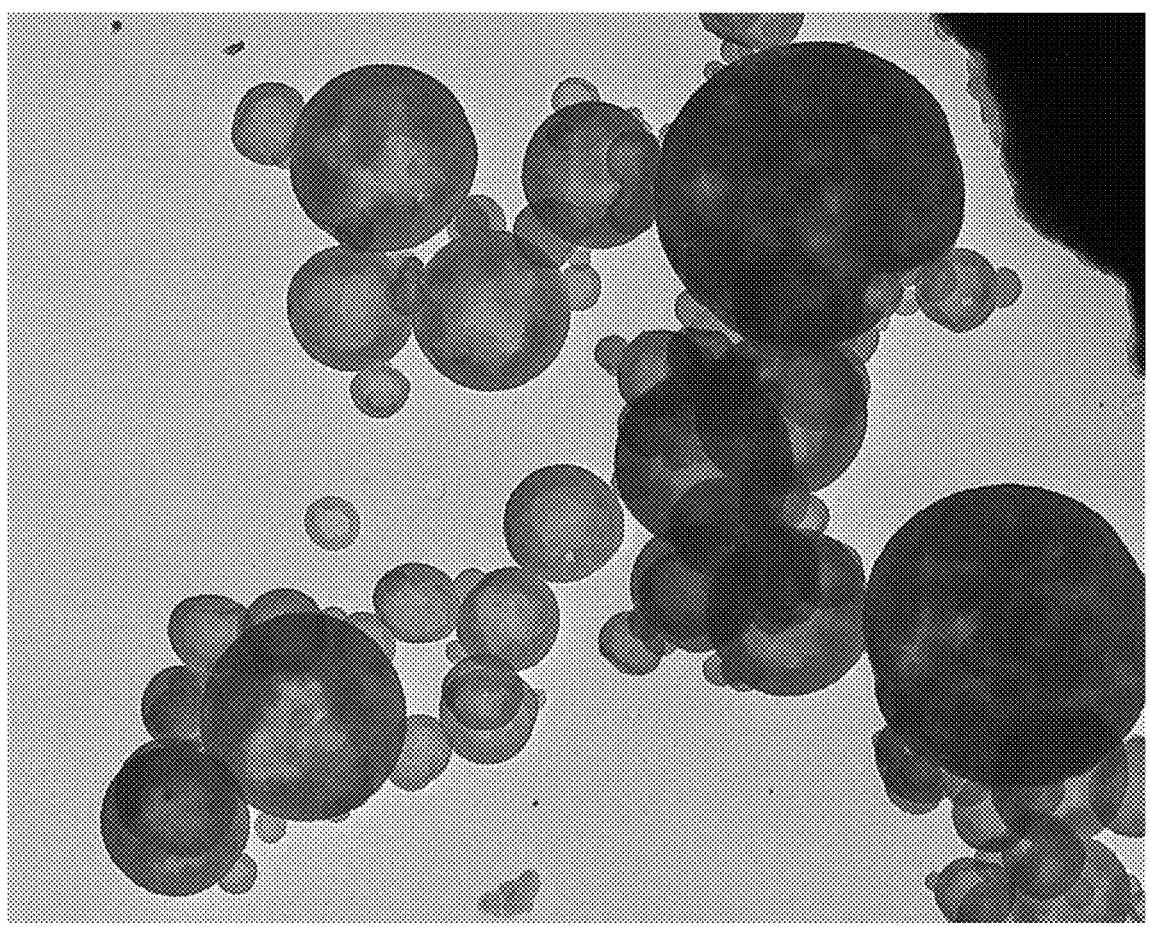
FIG. 3 is a TEM photograph of hollow resin particles (3) obtained in Example 3.

Hollow resin particles (3) were obtained by performing the same operations as in Example 1 except for using 1.49 g of styrene, 2.41 g of divinylbenzene 810, 1.5 g of heptane, and 0.126 g of PEROYL L. The resultant hollow resin particles (3) had an average particle diameter of 329 nm and a particle density of 0.69 g/cm$^3$. In addition, the TEM observation result of the resultant hollow resin particles (3) is shown in FIG. 3. It was able to be recognized that the hollow resin particles (3) were hollow resin particles each having a hollow surrounded by a shell. Blending amounts and the like are shown in Table 1.

Example 4

Figure 4:
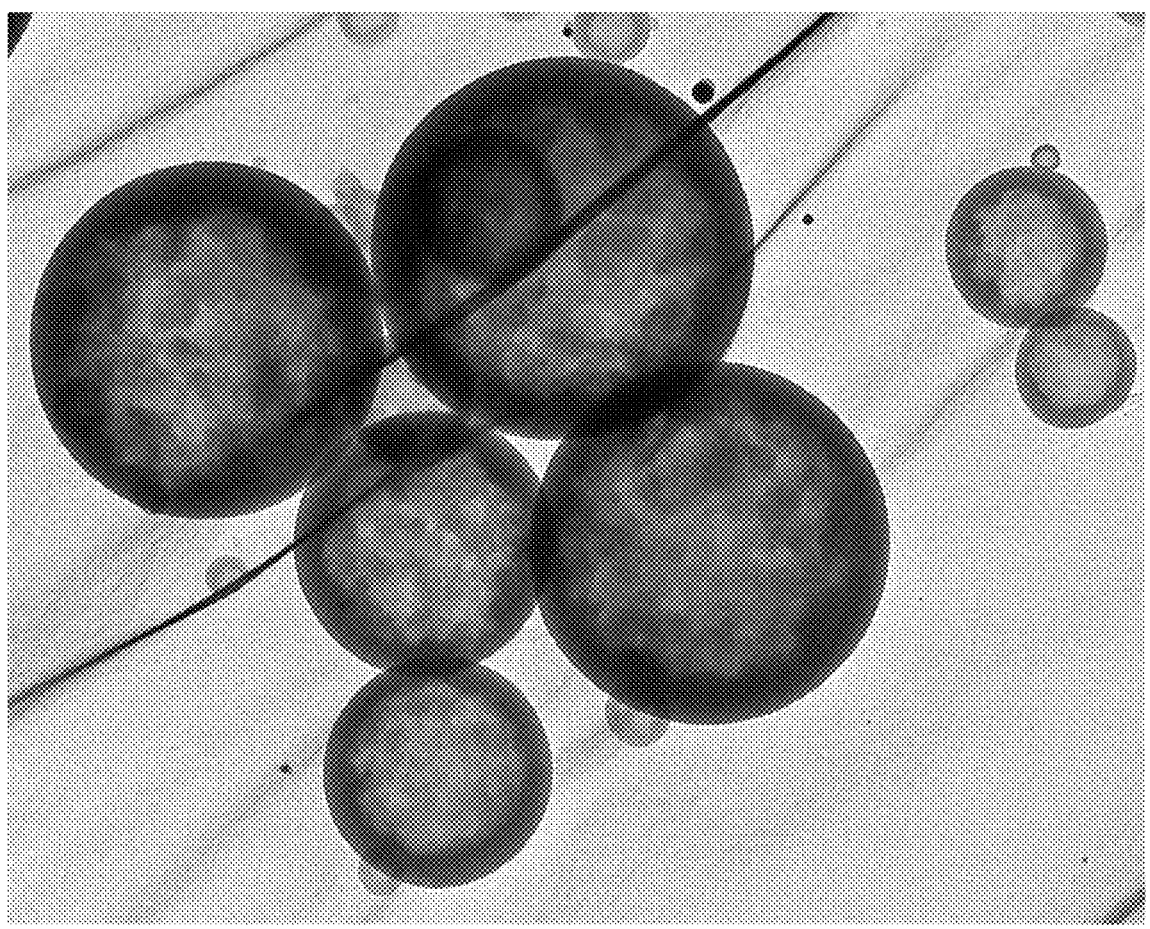
FIG. 4 is a TEM photograph of hollow resin particles (4) obtained in Example 4.

Hollow resin particles (4) were obtained by performing the same operations as in Example 1 except for using 1.19 g of styrene, 1.93 g of divinylbenzene 810, 0.10 g of PEROYL L, and 0.18 g of polystyrene (PS) (non-crosslinked, weight-average molecular weight: 300,000) instead of 0.3 g of HS Crysta-4100 (side chain crystalline polyolefin, Hokoku Corporation). The resultant hollow resin particles (4) had an average particle diameter of 390 nm and a particle density of 0.67 g/cm$^3$. In addition, the TEM observation result of the resultant hollow resin particles (4) is shown in FIG. 4. It was able to be recognized that the hollow resin particles (4) were hollow resin particles each having a hollow surrounded by a shell. Blending amounts and the like are shown in Table 1.

Example 5

Figure 5:
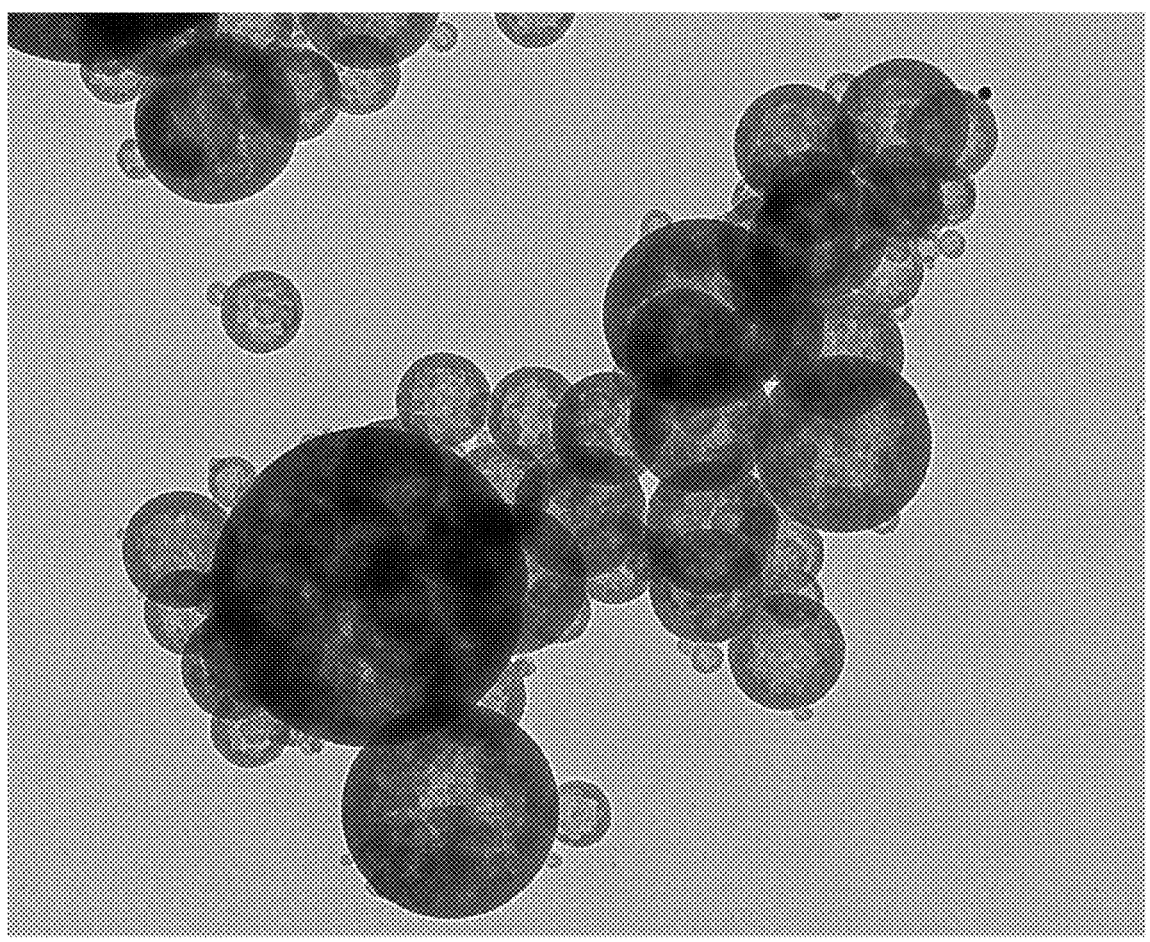
FIG. 5 is a TEM photograph of hollow resin particles (5) obtained in Example 5.

Hollow resin particles (5) were obtained by performing the same operations as in Example 1 except for: using 0.6 g of BLEMMER 50PEP-300; and omitting the use of HS Crysta-4100. The resultant hollow resin particles (5) had an average particle diameter of 310 nm. In addition, the TEM observation result of the resultant hollow resin particles (5) is shown in FIG. 5. It was able to be recognized that the hollow resin particles (5) were hollow resin particles each having a hollow surrounded by a shell. Blending amounts and the like are shown in Table 1.

Example 6

Hollow resin particles (6) were obtained by performing the same operations as in Example 1 except for using 0.3 g of BLEMMER PME-100 (polyethylene glycol methacrylate (in the formula (1), $R^1$=$CH_3$, $R^2$=$CH_3$, $(R^3-O)_m$=$(C_2H_4O)_2$), NOF Corporation) instead of 0.3 g of BLEMMER 50PEP-300 (polyethylene glycol propylene glycol monomethacrylate (in the formula (1), $R^1$=$CH_3$, $R^2$=H, $(R^3-O)_m$=$[(C_2H_4O)_{3.5} (C_3H_6O)_{2.5}]$, random addition mode), NOF Corporation).

Figure 6:
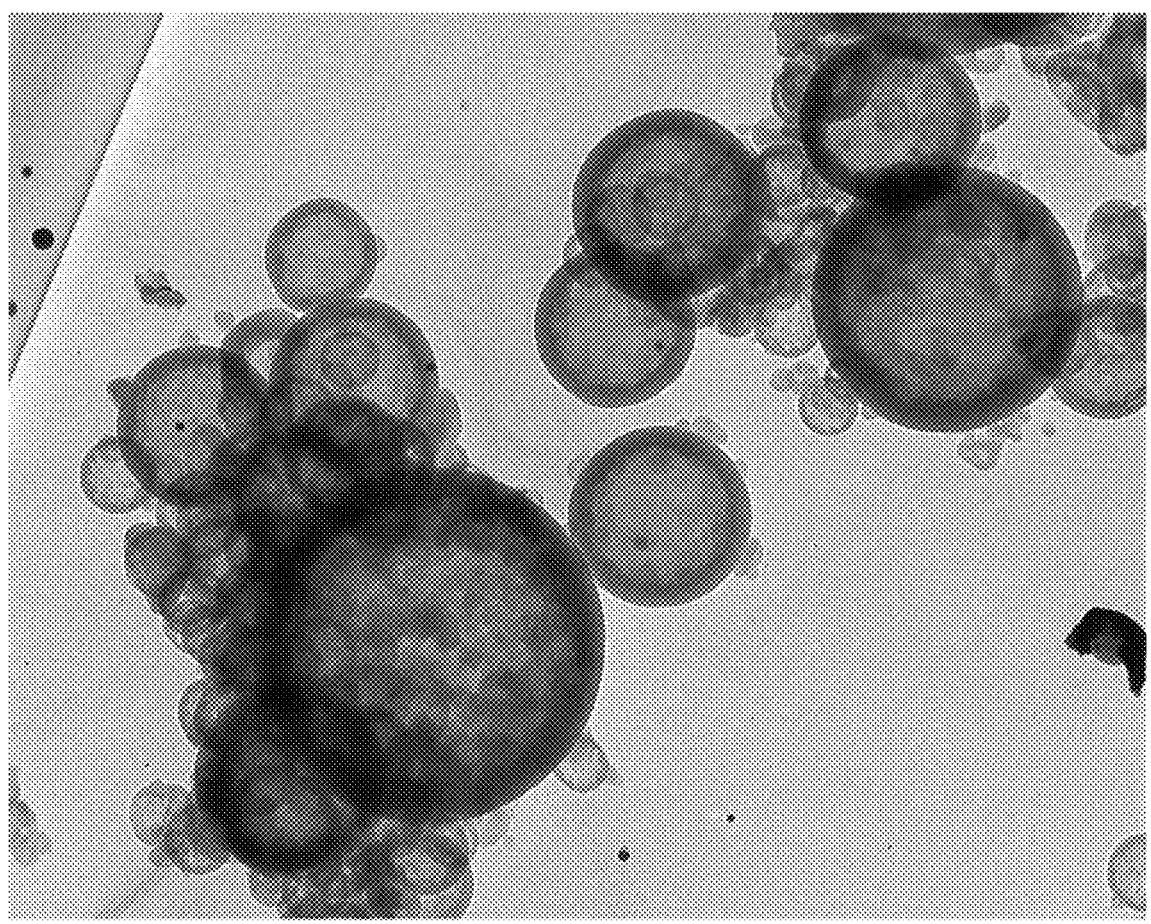
FIG. 6 is a TEM photograph of hollow resin particles (6) obtained in Example 6.

The resultant hollow resin particles (6) had an average particle diameter of 520 nm. In addition, the TEM observation result of the resultant hollow resin particles (6) is shown in FIG. 6. It was able to be recognized that the hollow resin particles (6) were hollow resin particles each having a hollow surrounded by a shell. Blending amounts and the like are shown in Table 1.

Example 7

Figure 7:
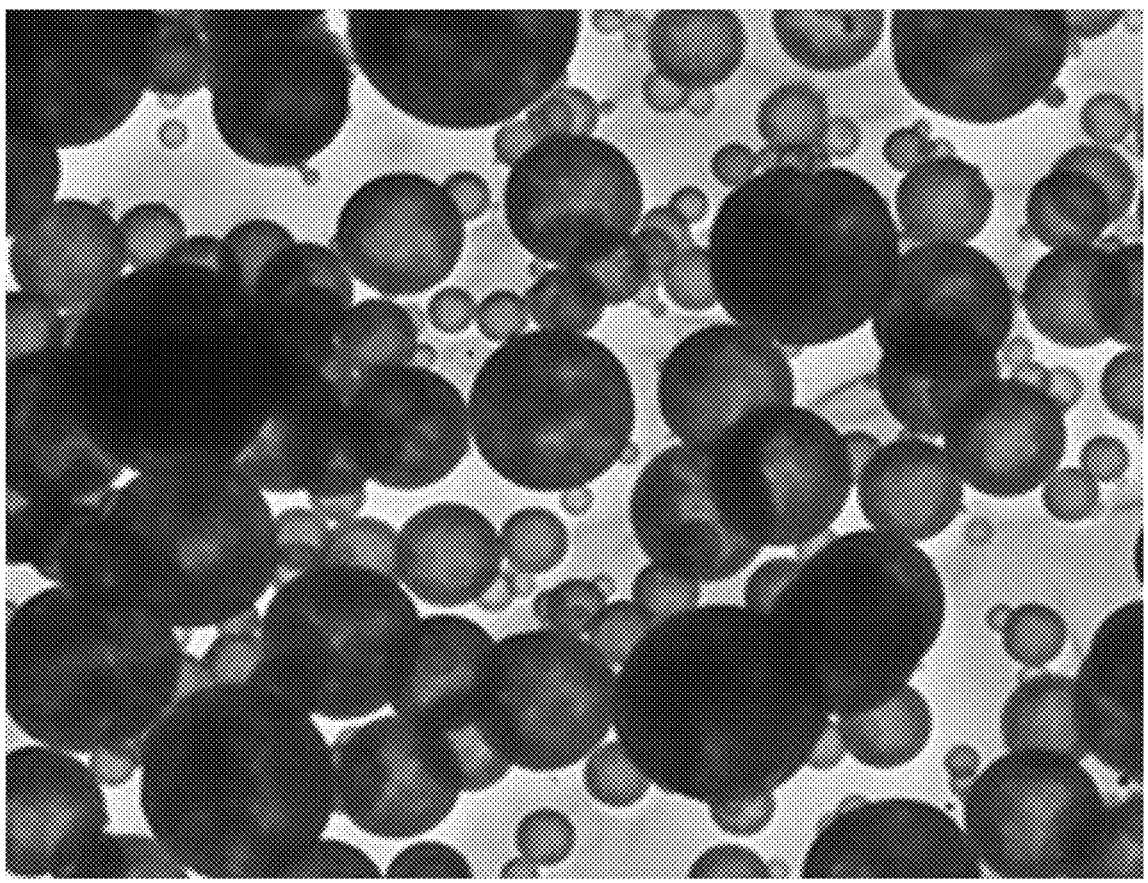
FIG. 7 is a TEM photograph of hollow resin particles (7) obtained in Example 7.

Hollow resin particles (7) were obtained by performing the same operations as in Example 3 except for using 0.3 g of BLEMMER PME-100 instead of using 0.3 g of BLEMMER 50PEP-300. The resultant hollow resin particles (7) had an average particle diameter of 501 nm and a particle density of 0.63 g/cm$^3$. In addition, the TEM observation result of the resultant hollow resin particles (7) is shown in FIG. 7. It was able to be recognized that the hollow resin particles (7) were hollow resin particles each having a hollow surrounded by a shell. Blending amounts and the like are shown in Table 1.

Example 8

Figure 8:
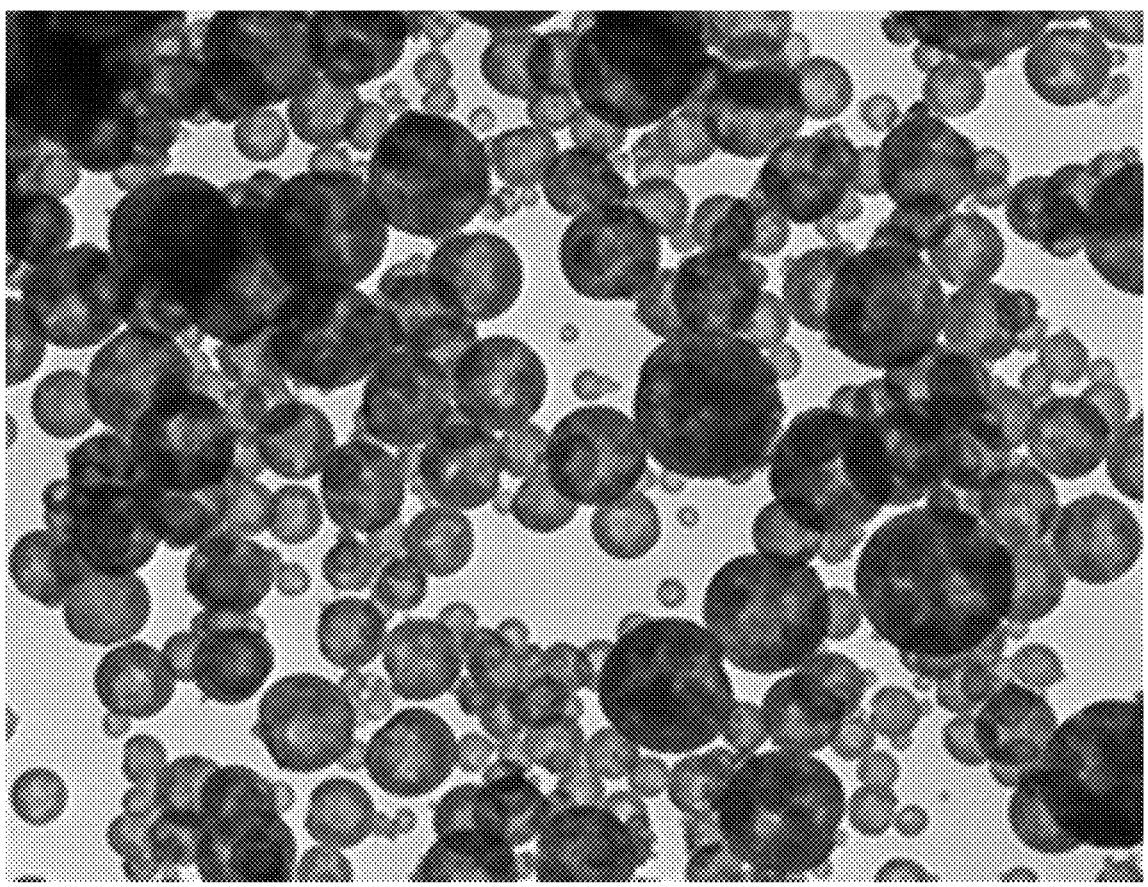
FIG. 8 is a TEM photograph of hollow resin particles (8) obtained in Example 8.

Hollow resin particles (8) were obtained by performing the same operations as in Example 3 except for using 0.3 g of BLEMMER 55PET-800 (polyethylene glycol tetramethylene glycol monomethacrylate (in the formula (1), $R^1$=$CH_3$, $R^2$=H, $(R^3-O)_m$=$[(C_2H_4O)_{10} (C_4H_8O)_5]$, random addition mode) instead of using 0.3 g of BLEMMER 50PEP-300. The resultant hollow resin particles (8) had an average particle diameter of 325 nm. In addition, the TEM observation result of the resultant hollow resin particles (8) is shown in FIG. 8. It was able to be recognized that the hollow resin particles (8) were hollow resin particles each having a hollow surrounded by a shell. Blending amounts and the like are shown in Table 1.

Example 9

Figure 9:
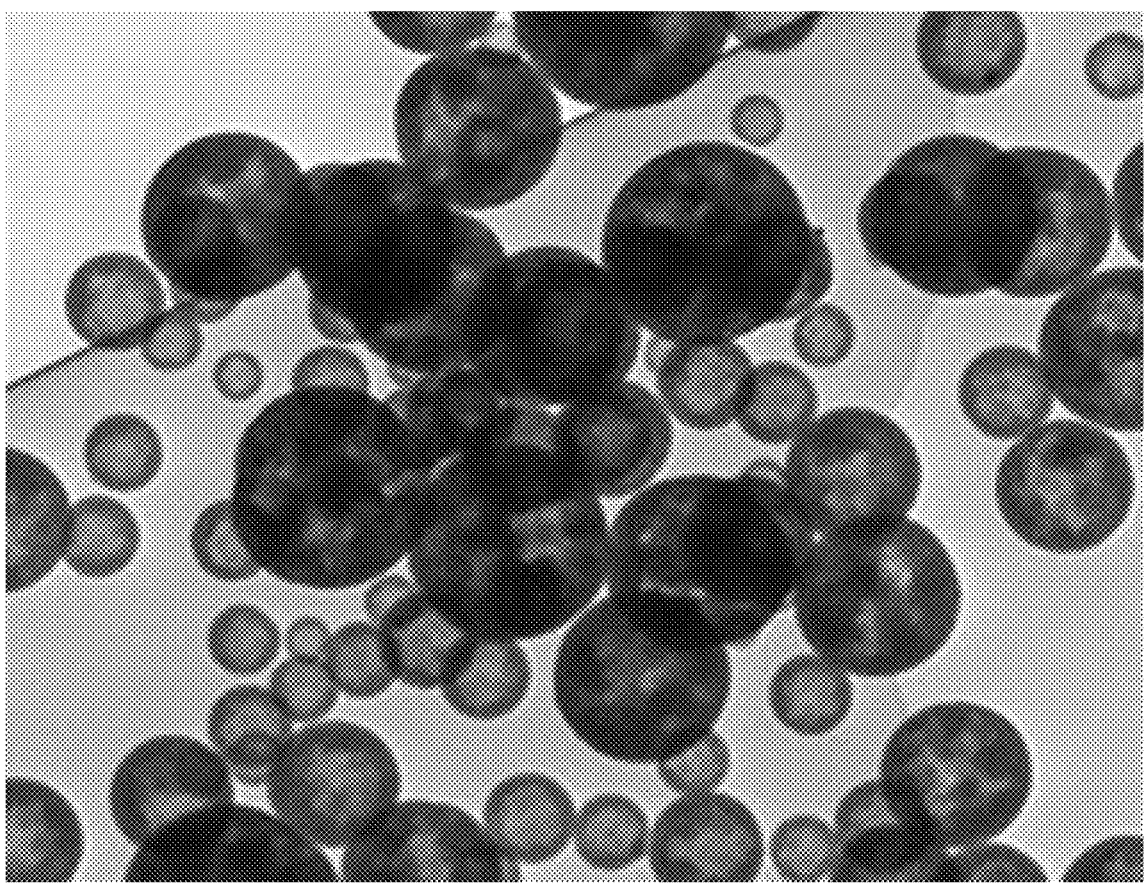
FIG. 9 is a TEM photograph of hollow resin particles (9) obtained in Example 9.

Hollow resin particles (9) were obtained by performing the same operations as in Example 3 except for using 0.0081 g of QUARTAMIN 86W (surfactant, Kao Corporation) instead of using 0.017 g of RAPISOL A-80. The resultant hollow resin particles (9) had an average particle diameter of 539 nm. In addition, the TEM observation result of the resultant hollow resin particles (9) is shown in FIG. 9. It was able to be recognized that the hollow resin particles (9) were hollow resin particles each having a hollow surrounded by a shell. Blending amounts and the like are shown in Table 1.

Example 10

Figure 10:
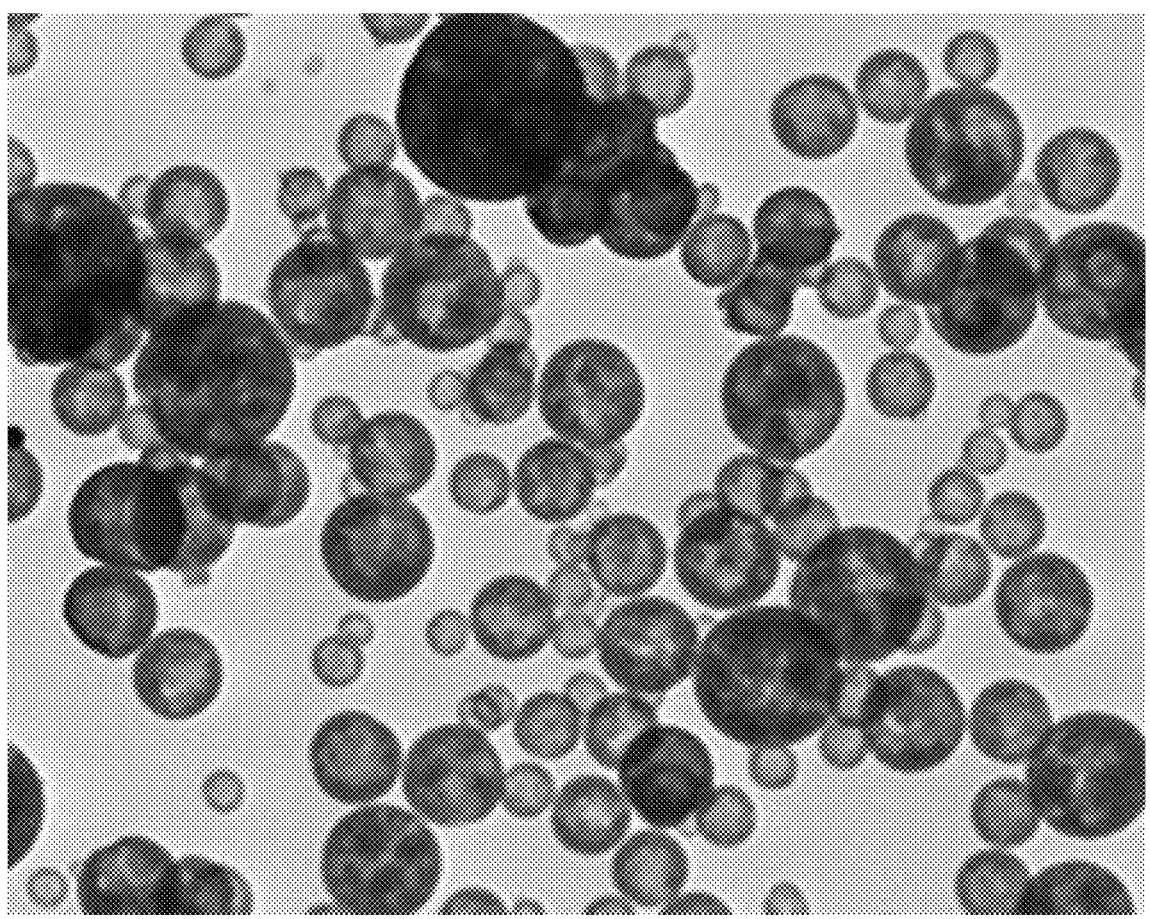
FIG. 10 is a TEM photograph of hollow resin particles (10) obtained in Example 10.

Hollow resin particles (10) were obtained by performing the same operations as in Example 3 except for using 0.034 g of ADEKA MINE 4MAC-30 (surfactant, ADEKA Corporation) instead of using 0.017 g of RAPISOL A-80. The resultant hollow resin particles (10) had an average particle diameter of 430 nm. In addition, the TEM observation result of the resultant hollow resin particles (10) is shown in FIG. 10. It was able to be recognized that the hollow resin particles (10) were hollow resin particles each having a hollow surrounded by a shell. Blending amounts and the like are shown in Table 1.

Example 11

Figure 11:
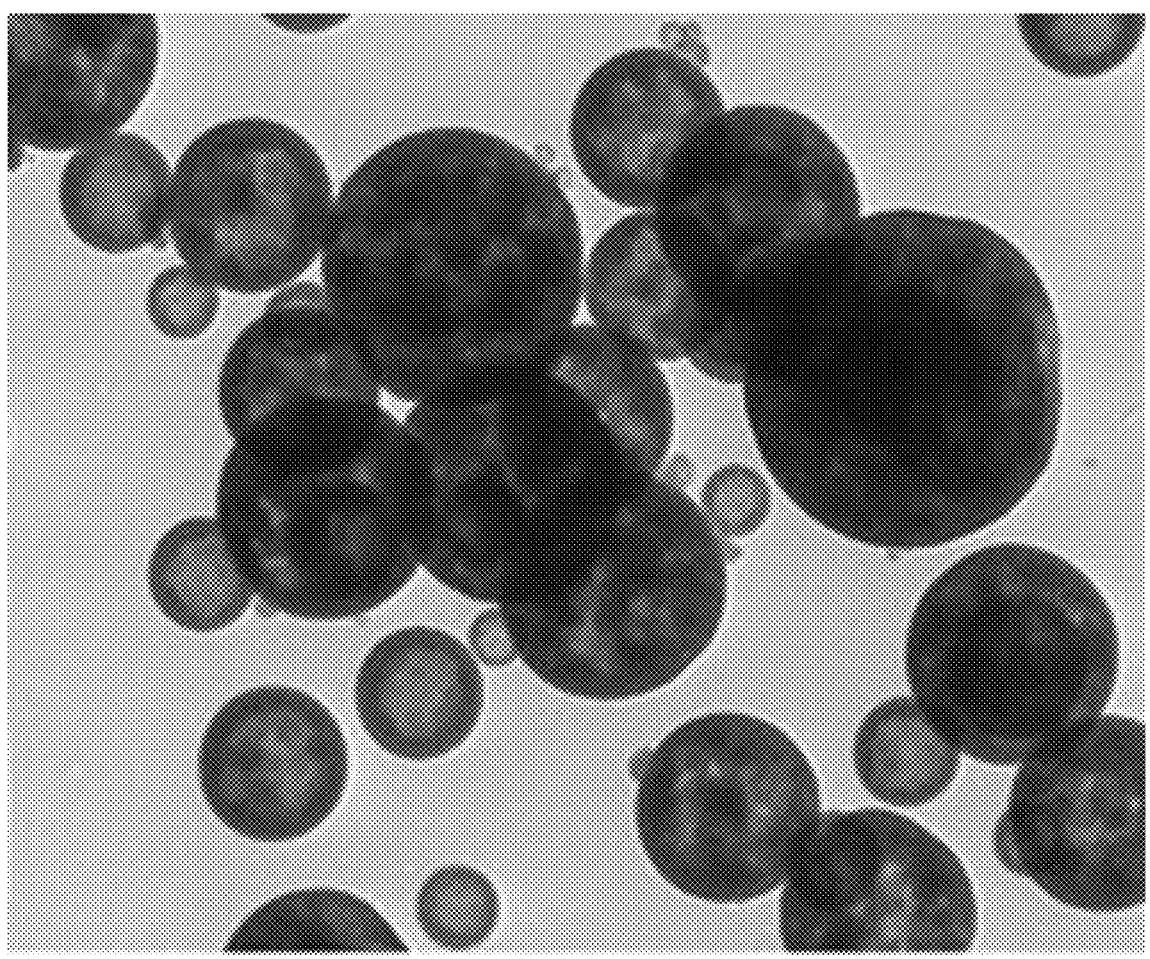
FIG. 11 is a TEM photograph of hollow resin particles (11) obtained in Example 11.

Hollow resin particles (11) were obtained by performing the same operations as in Example 3 except for using 0.0076 g of ADEKA MINE 4MAC-30 instead of using 0.017 g of RAPISOL A-80. The resultant hollow resin particles (11) had an average particle diameter of 1,270 nm. In addition, the TEM observation result of the resultant hollow resin particles (11) is shown in FIG. 11. It was able to be recognized that the hollow resin particles (11) were hollow resin particles each having a hollow surrounded by a shell. Blending amounts and the like are shown in Table 1.

Example 12

Figure 12:
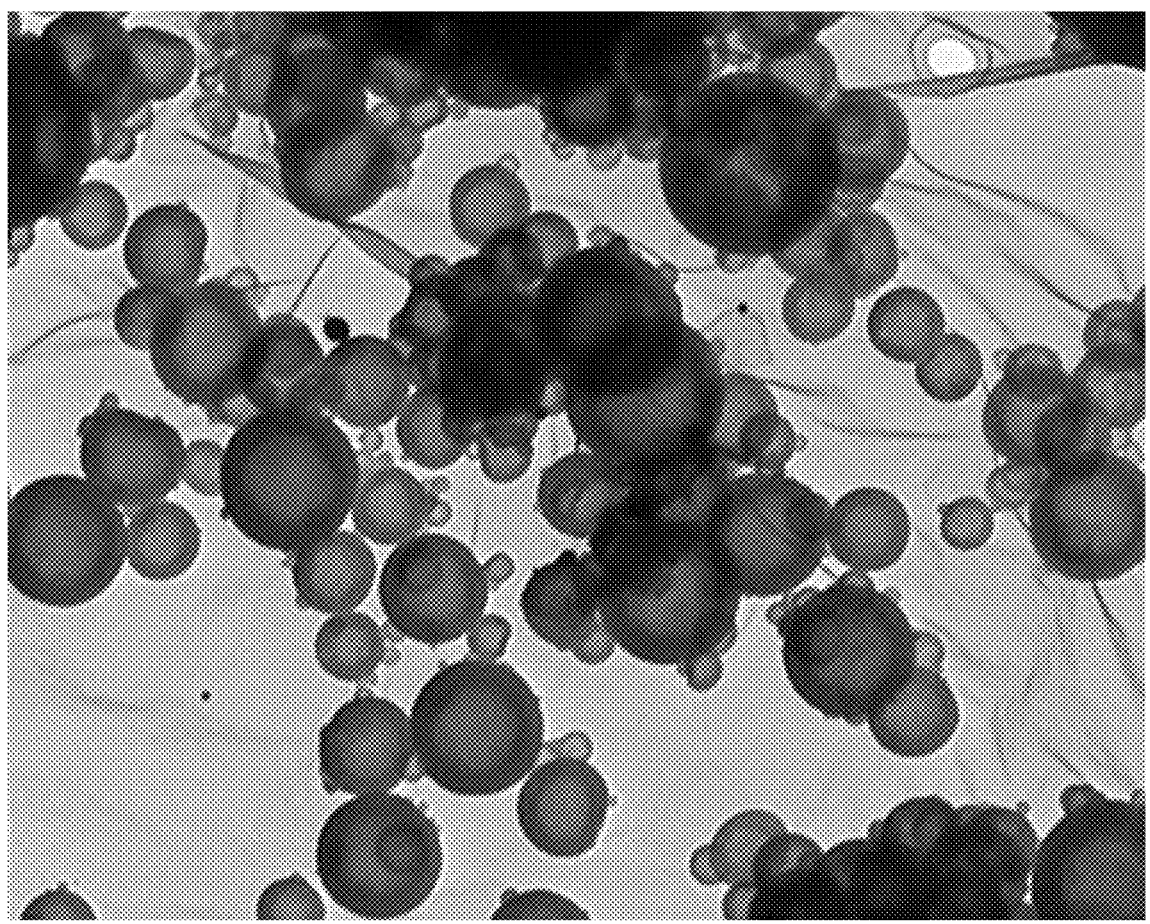
FIG. 12 is a TEM photograph of hollow resin particles (12) obtained in Example 12.

Hollow resin particles (12) were obtained by performing the same operations as in Example 3 except for using 1.38 g of styrene, 2.22 g of divinylbenzene 810, 1.5 g of cyclohexane instead of heptane, 0.6 g of HS Crysta-4100, 0.054 g of PEROYL L, and 0.0085 g of RAPISOL A-80. The resultant hollow resin particles (12) had an average particle diameter of 416 nm. In addition, the TEM observation result of the resultant hollow resin particles (12) is shown in FIG. 12. It was able to be recognized that the hollow resin particles (12) were hollow resin particles each having a hollow surrounded by a shell. Blending amounts and the like are shown in Table 1.

Comparative Example 1

1.74 g of methyl methacrylate (MMA), 1.74 g of dipentaerythritol hexaacrylate (ADPH) (Shin-Nakamura Chemical Co., Ltd.), 2.4 g of toluene, 0.126 g of polystyrene (non-crosslinked, weight-average molecular weight: 300,000), and 0.104 g of PEROYL L (polymerization initiator, NOF Corporation) were mixed to produce an oil phase.

Then, 34 g of ion-exchanged water and 0.034 g of RAPISOL A-80 (surfactant, NOF Corporation) were mixed to produce an aqueous phase.

Figure 13:
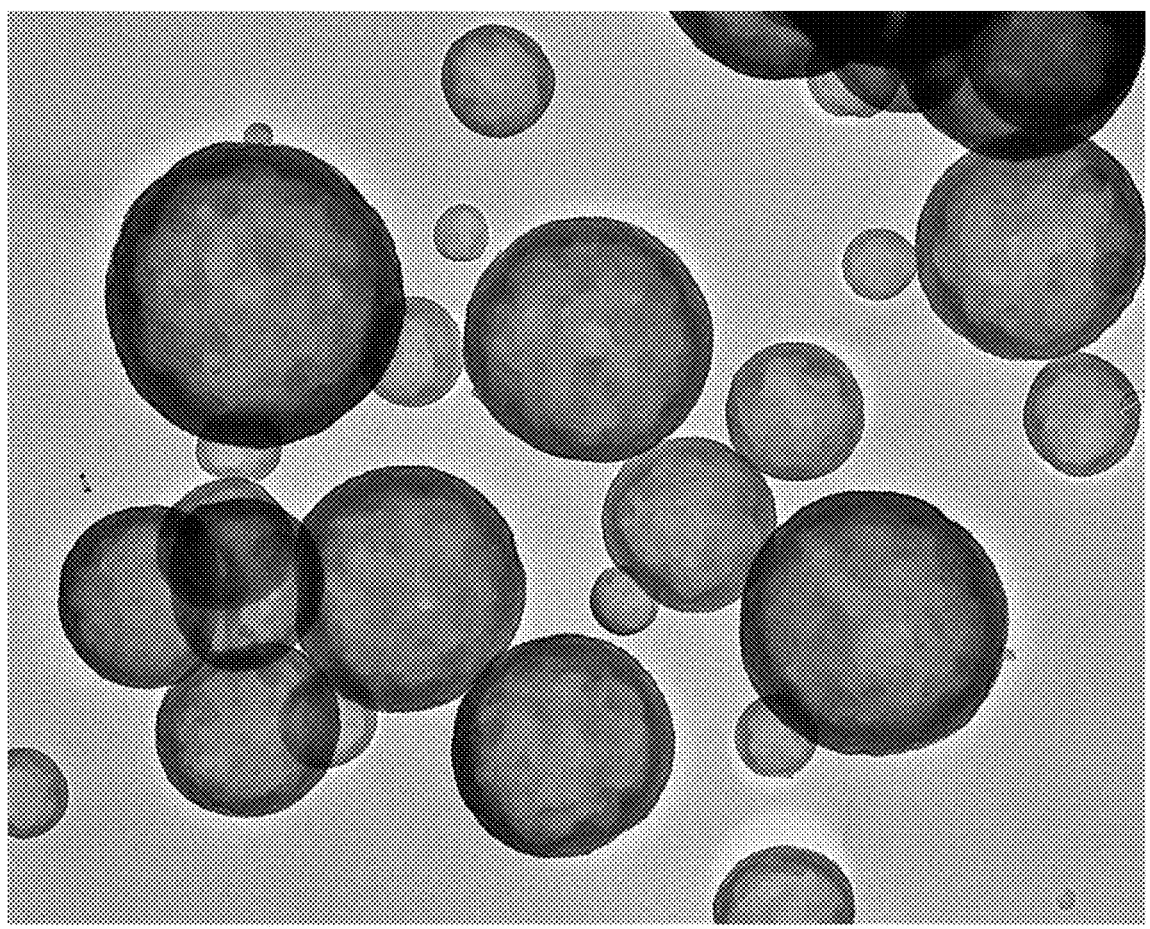
FIG. 13 is a TEM photograph of particles (C1) obtained in Comparative Example 1.

The oil phase was added to the aqueous phase, and an ultrasonic homogenizer (manufactured by BRANSON, SONIFIER 450, conditions: Duty Cycle=50%, Output Control=5, treatment time: 3 minutes) was used to produce a suspension. The resultant suspension was heated at 70° C. for 4 hours, and was thus polymerized to provide a slurry. The resultant slurry was heated at 100° C. for 24 hours to provide particles (C1) as dry powder. The resultant particles (C1) had an average particle diameter of 478 nm and a particle density of 0.614 g/cm$^3$. In addition, the TEM observation result of the resultant particles (C1) is shown in FIG. 13. It was able to be recognized that the particles (C1) were hollow resin particles each having a hollow surrounded by a shell. Blending amounts and the like are shown in Table 1.

Comparative Example 2

Figure 14:
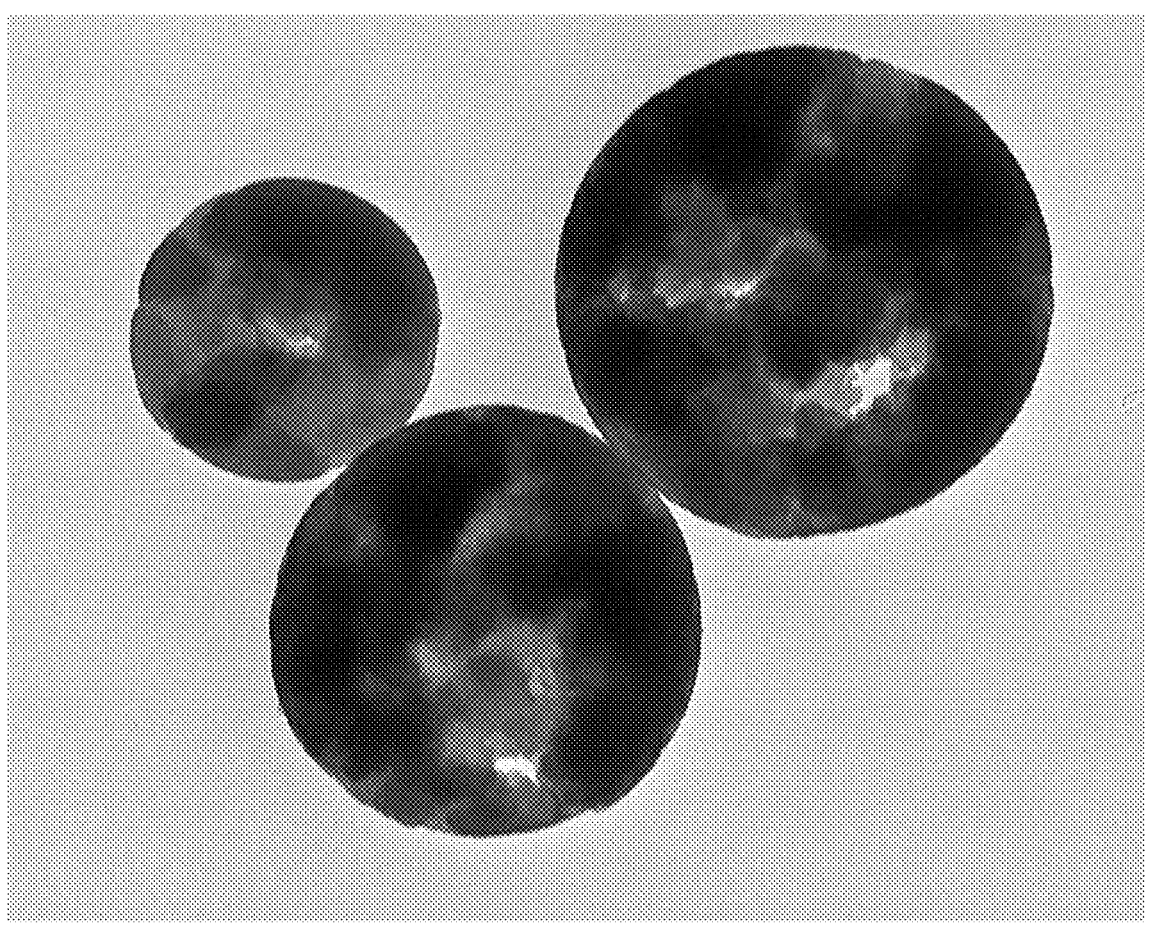
FIG. 14 is a TEM photograph of particles (C2) obtained in Comparative Example 2.

Particles (C2) were obtained by performing the same operations as in Example 1 except for: using 1.31 g of styrene, 2.11 g of divinylbenzene 810, 0.10 g of PEROYL L, and 0.18 g of polystyrene (non-crosslinked, weight-average molecular weight: 300,000) instead of 0.3 g of HS Crysta-4100 (side chain crystalline polyolefin, Hokoku Corporation); omitting the use of BLEMMER 50PEP-300; and adding 0.36 g of RN2025 (manufactured by DKS Co., Ltd.) serving as a reactive surfactant to the aqueous phase. The resultant particles (C2) had an average particle diameter of 350 nm. In addition, the TEM observation result of the resultant particles (C2) is shown in FIG. 14. It was able to be recognized that the particles (C2) were not hollow resin particles each having a hollow surrounded by a shell. Blending amounts and the like are shown in Table 1.

Comparative Example 3

Figure 15:
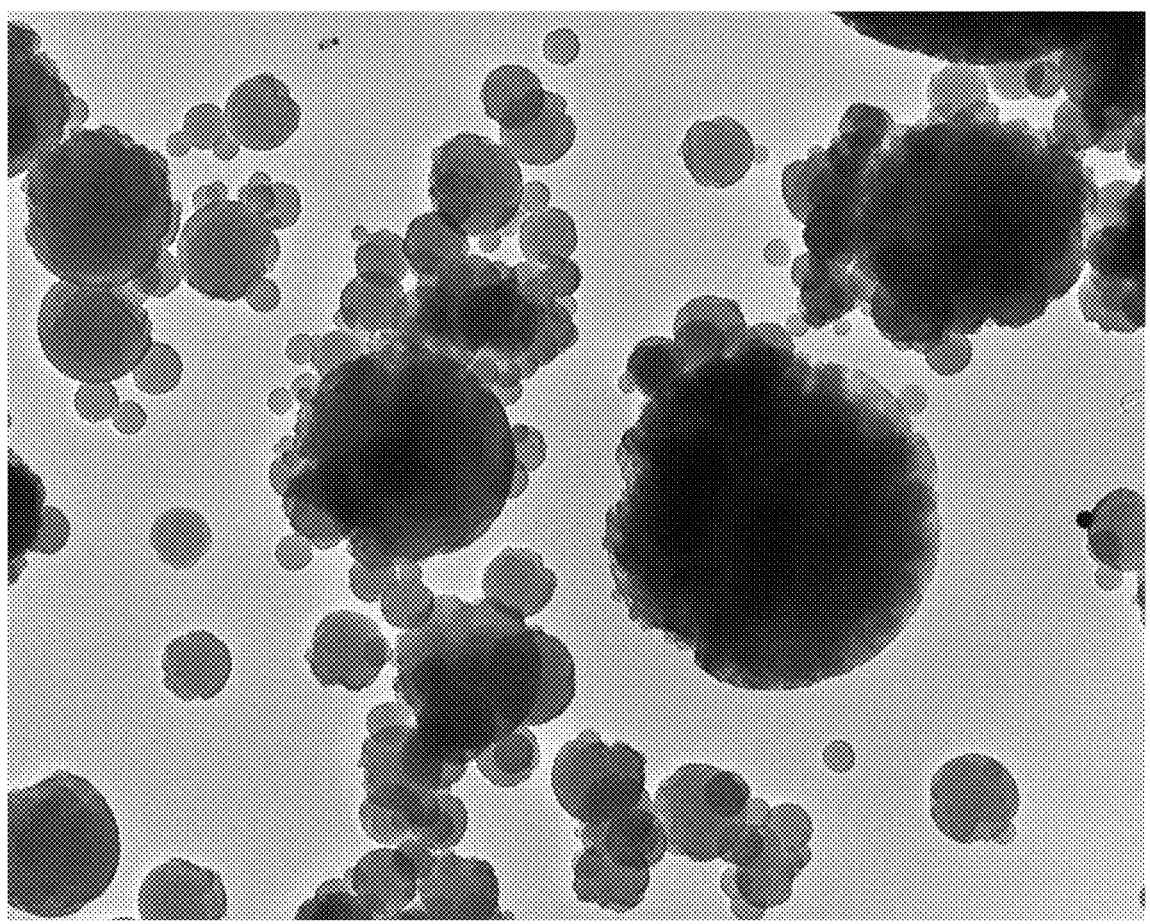
FIG. 15 is a TEM photograph of particles (C3) obtained in Comparative Example 3.

Particles (C3) were obtained by performing the same operations as in Example 1 except for: using 1.38 g of styrene, 2.22 g of divinylbenzene 810, 0.10 g of PEROYL L, and 0.18 g of polystyrene (non-crosslinked, weight-average molecular weight: 300,000); and omitting the use of HS Crysta-4100 and BLEMMER 50PEP-300. The resultant particles (C3) had an average particle diameter of 430 nm. In addition, the TEM observation result of the resultant particles (C3) is shown in FIG. 15. It was able to be recognized that the particles (C3) were not hollow resin particles each having a hollow surrounded by a shell. Blending amounts and the like are shown in Table 1.

TABLE 1

| | | | Example 1 | Example 2 | Example 3 | Example 4 | Example 5 | Example 6 |
|---|---|---|---|---|---|---|---|---|
| Oil phase | Monomer | DVD810 DVD: 81% EVB: 19% | 1.85 | 1.48 | 2.41 | 1.93 | 1.85 | 1.85 |
| | | ADPH | — | — | — | — | — | — |
| | | St | 1.15 | 0.92 | 1.49 | 1.19 | 1.15 | 1.15 |
| | | MMA | — | — | — | — | — | — |
| | | 50PEP-300 | 0.3 | 0.3 | 0.3 | 0.3 | 0.6 | — |
| | | PME-100 | — | — | — | — | — | 0.3 |

TABLE 1-continued

|  |  |  | | | | | | |
|---|---|---|---|---|---|---|---|---|
|  | Organic solvent | Heptane | 2.4 | 3.0 | 1.5 | 2.4 | 2.4 | 2.4 |
|  |  | Toluene | — | — | — | — | — | — |
|  | Non-crosslinked | HS 4100 | 0.3 | 0.3 | 0.3 | — | — | 0.3 |
|  | polymer | PS | — | — | — | 0.18 | — | — |
|  | Polymerization initiator | PEROYL L | 0.099 | 0.10 | 0.126 | 0.10 | 0.099 | 0.099 |
| Aqueous | Dispersion solvent | Water | 34 | 34 | 34 | 34 | 34 | 34 |
| phase | Surfactant | A-80 | 0.017 | 0.017 | 0.017 | 0.017 | 0.017 | 0.017 |
|  |  | RN2025 | — | — | — | — | — | — |
| Average particle diameter (nm) |  |  | 356 | 382 | 329 | 390 | 310 | 520 |

|  |  |  | Example 7 | Example 8 | Example 9 | Example 10 | Example 11 | Example 12 |
|---|---|---|---|---|---|---|---|---|
| Oil | Monomer | DVD810 | 2.41 | 2.41 | 2.41 | 2.41 | 2.41 | 2.22 |
| phase |  | DVD: 81% |  |  |  |  |  |  |
|  |  | EVB: 19% |  |  |  |  |  |  |
|  |  | ADPH | — | — | — | — | — | — |
|  |  | St | 1.49 | 1.49 | 1.49 | 1.49 | 1.49 | 1.38 |
|  |  | MMA | — | — | — | — | — | — |
|  |  | 50PEP-300 | — | — | 0.3 | 0.3 | 0.3 | 0.3 |
|  |  | PME-100 | 0.3 | — | — | — | — | — |
|  |  | 55PET-800 | — | 0.3 | — | — | — | — |
|  | Organic solvent | Heptane | 1.5 | 1.5 | 1.5 | 1.5 | 1.5 | — |
|  |  | Cyclohexane | — | — | — | — | — | 1.5 |
|  |  | Toluene | — | — | — | — | — | — |
|  | Non-crosslinked | HS 4100 | 0.3 | 0.3 | 0.3 | 0.3 | 0.3 | 0.6 |
|  | polymer | PS | — | — | — | — | — | — |
|  | Polymerization initiator | PEROYL L | 0.126 | 0.126 | 0.126 | 0.126 | 0.126 | 0.054 |
| Aqueous | Dispersion solvent | Water | 34 | 34 | 34 | 34 | 34 | 34 |
| phase | Surfactant | A-80 | 0.017 | 0.017 | — | — | — | 0.0085 |
|  |  | 86W | — | — | 0.0081 | — | — | — |
|  |  | 4MAC-30 | — | — | — | 0.034 | 0.076 | — |
|  |  | RN2025 | — | — | — | — | — | — |
| Average particle diameter (nm) |  |  | 501 | 325 | 539 | 430 | 1,270 | 416 |

|  |  |  | Comparative Example 1 | Comparative Example 2 | Comparative Example 3 |
|---|---|---|---|---|---|
| Oil | Monomer | DVD810 | — | 2.11 | 2.22 |
| phase |  | DVD: 81% |  |  |  |
|  |  | EVB: 19% |  |  |  |
|  |  | ADPH | 1.74 | — | — |
|  |  | St | — | 1.31 | 1.38 |
|  |  | MMA | 1.74 | — | — |
|  |  | 50PEP-300 | — | — | — |
|  |  | PME-100 | — | — | — |
|  |  | 55PET-800 | — | — | — |
|  | Organic solvent | Heptane | — | 2.4 | 2.4 |
|  |  | Cyclohexane | — | — | — |
|  |  | Toluene | 2.4 | — | — |
|  | Non-crosslinked | HS 4100 | — | — | — |
|  | polymer | PS | 0.126 | 0.18 | 0.18 |
|  | Polymerization initiator | PEROYL L | 0.104 | 0.10 | 0.10 |
| Aqueous | Dispersion solvent | Water | 34 | 34 | 34 |
| phase | Surfactant | A-80 | 0.034 | 0.017 | 0.017 |
|  |  | 86W | — | — | — |
|  |  | 4MAC-30 | — | — | — |
|  |  | RN2025 | — | 0.036 | — |
| Average particle diameter (nm) |  |  | 478 | 350 | 430 |

As shown in Examples 1 to 12, it is found that, when the shell contains the aromatic polymer (P1) obtained by polymerizing a monomer composition containing the aromatic crosslinkable monomer (a), the aromatic monofunctional monomer (b), and the (meth)acrylic acid ester-based monomer (c) represented by the formula (1), hollow resin particles each having a hollow surrounded by the shell and having an average particle diameter of from 0.1 μm to 5.0 μm are obtained without the use of a compound having a high boiling point, such as hexadecane.

<Performance Evaluation 1>

To a mixture of 8.3 g of ethyl acetate and 1.7 g of solvent-soluble polyimide KPI-MX300F (Kawamura Sangyo Co., Ltd.), 1.6 g of ethyl acetate having the particles of each kind dispersed therein at a concentration of 10 wt % was added, and the whole was defoamed and stirred using a planetary stirring defoamer (manufactured by Kurabo Industries Ltd., Mazerustar KK-250) to produce a mixture for evaluation.

The mixture for evaluation was applied to a glass plate having a thickness of 5 mm through use of an applicator set to a wet thickness of 250 μm, and then the resultant was heated at 60° C. for 30 minutes, at 90° C. for 10 minutes, at 150° C. for 30 minutes, and at 200° C. for 30 minutes to remove ethyl acetate, followed by cooling to room temperature. Thus, a film sample containing the particles of each kind was obtained. The resultant film was evaluated for its relative dielectric constant and dielectric loss tangent by a cavity resonance method (measurement frequency: 5.8 GHZ). The results are shown in Table 2.

TABLE 2

|  | Film containing hollow resin particles (1) of Example 1 | Film containing particles (C1) of Comparative Example 1 | Film containing no particles (reference) |
|---|---|---|---|
| Relative dielectric constant | 2.32 | 2.46 | 2.46 |
| Dielectric loss tangent | 0.0089 | 0.0122 | 0.0093 |

In view of the results of Table 2, the hollow resin particles provided by the present invention can be recognized as having the effect of reducing the relative dielectric constant and dielectric loss tangent of the base material, and are found to be effective for the purpose of achieving reductions in dielectricity and dielectric loss tangent of the base material.

<Performance Evaluation 2>

The slurry obtained in each of Examples and Comparative Examples was dried using Mini Spray Dryer B-290 (Nihon Buchi K. K.) to provide hollow resin particles or particles as dry powder. 0.425 g of the obtained hollow resin particles or particles, 12.1 g of ethyl acetate, and 1.7 g of solvent-soluble polyimide KPI-MX300F (Kawamura Sangyo Co., Ltd.) were defoamed and stirred using a planetary stirring defoamer (manufactured by Kurabo Industries Ltd., Mazerustar KK-250) to produce a mixture for evaluation.

The mixture for evaluation was applied to a glass plate having a thickness of 5 mm through use of an applicator set to a wet thickness of 250 μm, and then the resultant was heated at 60° C. for 30 minutes, at 90° C. for 10 minutes, at 150° C. for 30 minutes, and at 200° C. for 30 minutes to remove ethyl acetate, followed by cooling to room temperature. Thus, a film sample containing the particles of each kind was obtained. The resultant t film was evaluated for its relative dielectric constant and dielectric loss tangent by a cavity resonance method (measurement frequency: 5.8 GHz). The results are shown in Table 3.

TABLE 3

|  | Film containing hollow resin particles (1) of Example 1 | Film containing hollow resin particles (2) of Example 2 | Film containing hollow resin particles (3) of Example 3 | Film containing hollow resin particles (4) of Example 4 | Film containing hollow resin particles (7) of Example 7 | Film containing particles (C1) of Comparative Example 1 |
|---|---|---|---|---|---|---|
| Relative dielectric constant | 2.24 | 2.36 | 2.26 | 2.24 | 2.36 | 2.39 |
| Dielectric loss tangent | 0.0094 | 0.0107 | 0.0092 | 0.0081 | 0.0087 | 0.0160 |

In view of the results of Table 3, the hollow resin particles provided by the present invention can be recognized as having the effect of reducing the relative dielectric constant of the base material while suppressing an increase in dielectric loss tangent as compared to the particles (C1) of Comparative Example 1, and are found to be effective for the purpose of achieving reductions in dielectricity and dielectric loss tangent of the base material. The relative dielectric constants of the hollow resin particles calculated from the results were as follows: 1.90 for the hollow resin particles (1) of Example 1; 2.20 for the hollow resin particles (2) of Example 2; 1.93 for the hollow resin particles (3) of Example 3; 1.90 for the hollow resin particles (4) of Example 4; 2.20 for the hollow resin particles (7) of Example 7; and 2.28 for the particles (C1) of Comparative Example 1. The calculation was performed on the assumption that the density of the base material was 1.57 g/cm$^3$.

<Performance Evaluation 3>

The slurry obtained in each of Examples and Comparative Examples was dried using Mini Spray Dryer B-290 (Nihon Buchi K. K.) to provide hollow resin particles or particles as dry powder. 0.4 g of the obtained hollow resin particles or particles and 10 g of ultra-high-temperature resistant polyimide varnish (SPIXAREA HR002, SOMAR Corporation) were defoamed and stirred using a planetary stirring defoamer (manufactured by Kurabo Industries Ltd., Mazerustar KK-250) to produce a mixture for evaluation.

The mixture for evaluation was applied to a glass plate having a thickness of 5 mm through use of an applicator set to a wet thickness of 250 μm, and then the resultant was heated at 120° C. for 10 minutes, at 180° C. for 180 minutes, and at 270° C. for 60 minutes to remove the solvent, followed by cooling to room temperature. Thus, a film sample containing the particles of each kind was obtained. The resultant film was evaluated for its relative dielectric constant and dielectric loss tangent by a cavity resonance method (measurement frequency: 5.8 GHZ). The results are shown in Table 4.

TABLE 4

|  | Film containing hollow resin particles (3) of Example 3 | Film containing particles (C1) of Comparative Example 1 | Film containing no particles (reference) |
|---|---|---|---|
| Relative dielectric constant | 3.02 | 3.13 | 3.45 |
| Dielectric loss tangent | 0.0299 | 0.0322 | 0.0321 |

In view of the results of Table 4, the hollow resin particles provided by the present invention can be recognized as having the effect of reducing the relative dielectric constant and dielectric loss tangent of the base material, and are found to be effective for the purpose of achieving reductions in dielectricity and dielectric loss tangent of the base material.

INDUSTRIAL APPLICABILITY

The hollow resin particle according to the embodiment of the present invention, or the hollow resin particle obtained by the production method according to the embodiment of the present invention is applicable to a semiconductor material and the like.

The invention claimed is:

1. A hollow resin particle, comprising:
a shell portion; and
a hollow portion surrounded by the shell portion,
wherein the shell portion contains an aromatic polymer (P1) obtained by polymerizing a monomer composition containing:
an aromatic crosslinkable monomer (a);
an aromatic monofunctional monomer (b); and
a (meth)acrylic acid ester-based monomer (c) represented by the formula (1):

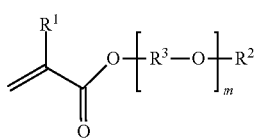

where $R^1$ represents H or $CH_3$, $R^2$ represents H, an alkyl group, or a phenyl group, $R^3$—O represents an oxyalkylene group having 2 to 18 carbon atoms, and "m" represents an average number of moles added of the oxyalkylene group and represents a number of from 1 to 100,
and wherein the shell portion contains a non-crosslinked polymer (P2) that is a polyolefin.

2. The hollow resin particle according to claim 1, wherein the oxyalkylene group is at least one kind selected from the group consisting of: an oxyethylene group; an oxypropylene group; and an oxybutylene group.

3. The hollow resin particle according to claim 1, wherein the monomer composition contains 10 wt % to 70 wt % of the aromatic crosslinkable monomer (a), 10 wt % to 70 wt % of the aromatic monofunctional monomer (b), and 0.5 wt % to 30 wt % of the (meth)acrylic acid ester-based monomer (c) represented by the formula (1).

4. The hollow resin particle according to claim 1, wherein the aromatic crosslinkable monomer (a) is divinylbenzene.

5. The hollow resin particle according to claim 1, wherein the aromatic monofunctional monomer (b) is at least one kind selected from the group consisting of: styrene; and ethylvinylbenzene.

6. A method of producing the hollow resin particle of claim 1, comprising dispersing an organic mixed solution in an aqueous solution containing at least one kind selected from the group consisting of: a dispersion stabilizer; and a surfactant, followed by suspension polymerization, the organic mixed solution containing a monomer composition containing the aromatic crosslinkable monomer (a), the aromatic monofunctional monomer (b), and the (meth)acrylic acid ester-based monomer (c) represented by the formula (1), the non-crosslinked polymer (P2), a polymerization initiator, and an organic solvent having a boiling point of less than 100° C.

7. A semiconductor material, comprising the hollow resin particle of claim 1.

* * * * *